United States Patent
Ma et al.

(10) Patent No.: US 11,677,344 B2
(45) Date of Patent: Jun. 13, 2023

(54) STABILITY EVALUATION METHOD AND SYSTEM OF DIRECT-DRIVE WIND TURBINE GENERATOR

(71) Applicant: North China Electric Power University, Beijing (CN)

(72) Inventors: Jing Ma, Beijing (CN); Yaqi Shen, Beijing (CN); Shengjin Wu, Beijing (CN); Min Zhang, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 422 days.

(21) Appl. No.: 16/891,974

(22) Filed: Jun. 3, 2020

(65) Prior Publication Data
US 2021/0036639 A1     Feb. 4, 2021

(30) Foreign Application Priority Data

Jul. 30, 2019   (CN) .......................... 201910695024.6

(51) Int. Cl.
*F03D 9/25*     (2016.01)
*H02P 9/10*     (2006.01)
(Continued)

(52) U.S. Cl.
CPC ................ *H02P 9/105* (2013.01); *F03D 9/25* (2016.05); *F03D 15/00* (2016.05); *F03D 17/00* (2016.05);
(Continued)

(58) Field of Classification Search
CPC ... Y02E 10/72; Y02E 10/763; H02P 2101/15; H02P 9/105; F03D 17/00; F03D 9/25;
(Continued)

(56) References Cited

U.S. PATENT DOCUMENTS 11,306,703 B2 *  4/2022  Tolli ........................ F16H 53/02
2009/0230980 A1 *  9/2009  Williams ............... G01R 27/32
324/707
(Continued)

FOREIGN PATENT DOCUMENTS

CN        107370180 A      11/2017
CN        109193752 A       1/2019
WO    WO-2017174085 A1 *  10/2017

OTHER PUBLICATIONS

Du, W., et al., "Concept of Modal Repulsion for Examining the Subsynchronous Oscillations Caused by Wind Farms in Power Systems," IEEE Transactions on Power Systems, vol. 34, No. 1, pp. 518-526, Jan. 2019.
(Continued)

*Primary Examiner* — Vincent H Tran
(74) *Attorney, Agent, or Firm* — Syncoda LLC; Feng Ma

(57) ABSTRACT

The application involves a stability evaluation method and system of direct-drive wind turbine generator, which belongs to the technical field of wind power generation. It solves the problems of poor stability of direct-drive wind turbine generator, low safety performance, failure to realize mutual cooperation between online stability evaluation and parameter adjustment in the existing technology. Firstly, the variation of direct-drive wind turbine generator terminal voltage, current, power and PLL angle of direct-drive wind turbine generator is measured, the terminal energy and the energy negative gradient of direct-drive wind turbine generator is calculated. Then, the system stability is assessed according to the value of energy negative gradient, the influence of the critical parameters on system stability is analyzed and the preliminary adjustment strategy is proposed. It realizes the mutual cooperation between stability
(Continued)

level evaluation and parameter adjustment, and improves the working efficiency of the system.

8 Claims, 12 Drawing Sheets

(51) Int. Cl.
  *F03D 15/00* (2016.01)
  *F03D 17/00* (2016.01)
  *G05B 23/02* (2006.01)
  *H02P 101/15* (2016.01)
(52) U.S. Cl.
  CPC ............... *G05B 23/0286* (2013.01); *G05B 2219/34001* (2013.01); *H02P 2101/15* (2015.01)
(58) Field of Classification Search
  CPC .. G05B 2219/2619; G05B 2219/34001; G05B 23/0286
  See application file for complete search history.

(56) References Cited

U.S. PATENT DOCUMENTS

2012/0056602 A1* 3/2012 Li ........................... H02P 9/48 322/89
2017/0130699 A1* 5/2017 Achilles ............. G05B 13/0205

OTHER PUBLICATIONS

Gu, K., et al., "Sub-Synchronous Interactions in Power Systems with Wind Turbines: A Review," IET Renewable Power Generation, vol. 13, No. 1, pp. 4-15, Jul. 1, 2019.
Cespedes, M., et al., "Impedance Modeling and Analysis of Grid-Connected Voltage-Source Converters." IEEE Transactions on Power Electronics vol. 3, No. 29, pp. 1254-1261, 2014.
Liu, H., et al. "Sub-synchronous Interaction between Direct-Drive PMSG Based Wind Farms and Weak AC Networks." IEEE Transactions on Power Systems pp. 1-1, 2017.
Huang, B., et al. "Study on Sub-synchronous Oscillation in D-PMSGs-based Wind Farm Integrated to Power System." IET Renewable Power Generation vol. 1, No. 13, pp. 16-26, 2019.
Liu, H., et al. "Quantitative SSR Analysis of Series-Compensated DFIG-Based Wind Farms using Aggregated RLC Circuit Model." IEEE Transactions on Power Systems. vol. 32, No. 1, pp. 484-483, 2017.
Leon, A. E., et al., "Sub-synchronous Resonance Mitigation using Variable-Speed Wind Energy Conversion Systems." IET Generation, Transmission & Distribution vol. 7, No. 5, pp. 511-525, 2013.
Wang, S., Et al., "Increasing the SSO Damping Effectiveness of IMDU by Raising Its Operating Frequency and Optimizing Its Parameters." IEEE Transactions on Power Systems. vol. 3, No. 28, pp. 3134-3144, 2013.
Wu, M., et al. "A Study on the Impact of Wind Farm Spatial Distribution on Power System Sub-Synchronous Oscillations". IEEE Transactions on Power Systems, vol. 3, No. 31, pp. 2154-2162, 2016.
Zhu, X., et al. "Improved Complex Torque Coefficient Method using CPCM for Multi-Machine System SSR Analysis". IEEE Transactions on Power Systems, vol. 5, No. 29, pp. 2060-2068, 2014.
Chen, W., et al., "Identification of Modeling Boundaries for SSR Studies in Series Compensated Power Networks," IEEE Transactions on Power Systems, vol. 32, No. 6, pp. 4851-4860, Nov. 2017.
Shi, L., et al., "Sub-Synchronous Resonance Analysis and Simulation on Wind Farm," 2017 2nd International Conference on Power and Renewable Energy (ICPRE), Chengdu, 2017, pp. 412-416.
Moon, Y. H., et al. "Energy Conservation Law and Its Application for the Direct Energy Method of Power System Stability" IEEE Power Engineering Society Winter Meeting. IEEE, 1999.
Bi, T., et al. "Study on Response Characteristics of Grid-Side Converter Controller of PMSG to Sub-Synchronous Frequency Component". IET Renewable Power Generation, vol. 7, No. 11, pp. 966-972, 2017.
Dong, D., et al. "Analysis of Phase-Locked Loop Low-Frequency Stability in Three-Phase Grid-Connected Power Converters Considering Impedance Interactions". IEEE Transactions on Industrial Electronics, vol. 1, No. 62, pp. 310-321, 2015.
Office Action issued in CN patent application No. 201910695024.6 dated Jul. 3, 2020.

* cited by examiner

STABILITY EVALUATION METHOD AND SYSTEM OF DIRECT-DRIVE WIND TURBINE GENERATOR

CROSS-REFERENCE TO RELATED APPLICATIONS

This application claims priority to Chinese Patent Application No. 201910695024.6, filed on Jul. 30, 2019, which is hereby incorporated by reference in its entirety.

TECHNICAL FIELD

The application relates to the technical field of wind power generation system, and particularly relates to a stability evaluation method and system of direct-drive wind turbine generator.

BACKGROUND

As a renewable, clean, pollution-free and inexhaustible energy, wind energy has become an important direction of the development of renewable energy in the world. The direct-drive wind turbine generator has become the key models of research because of its advantages of small mechanical loss, high operation efficiency and low maintenance cost and the like.

The problem of sub/super-synchronous oscillation caused by the direct-drive wind turbine generators connected to weak power grid has gradually become prominent, and has occurred even more frequent especially in collecting areas of wind farms. Therefore, it has become an urgent problem to study how to assess the stable level of system fast and effectively in the early stage of oscillation and provide accurate theoretical reference for oscillation suppression and system dispatch.

At present, the stability analysis of sub/super-synchronous oscillations has gradually become the focus of many experts and scholars at home and abroad. However, existing analysis methods have a large calculation workload for solving nonlinear differential equations, they can only provide offline stability criteria, it is difficult to perform real-time online stability assessment, and it is impossible to perform effective online parameter adjustment.

SUMMARY

Based upon former analysis, the present embodiment aims to provide a stability evaluation method and system of direct-drive wind turbine generator to solve the problems of poor stability, low safety performance, and failure to realize online stability evaluation and parameter adjustment in the existing technology.

The aims of the application are mainly realized by the following technical scheme.

A stability evaluation method of direct-drive wind turbine generator includes the following steps:

measuring the variation of voltage, current, active power and PLL angle at the terminal of direct-drive wind turbine generator in one oscillation period $$\frac{2\pi}{\omega};$$

based on the measurements of the variation, calculating the terminal energy of direct-drive wind turbine generator with the established terminal energy model of direct-drive wind turbine generator;

according to the calculated terminal energy of direct-drive wind turbine generator, obtaining energy negative gradient of direct-drive wind turbine generator, and assessing system stability level according to the value of the energy negative gradient; and based on the influence of critical parameters of stable operation points of direct-drive wind turbine generator, PLL and transmission lines on the energy negative gradient, obtaining the adjustment law of critical parameters affecting the stability of the system.

On the basis of the above scheme, the application also makes the following improvements:

furthermore, the terminal energy model of direct-drive wind turbine generator is:

$$\Delta W_{PMSG}(t) = \int_t^{t+\frac{2\pi}{\omega}} \Delta P_e d\Delta\theta_{pll} + \int_t^{t+\frac{2\pi}{\omega}} (\Delta i_d d\Delta u_q - \Delta i_q d\Delta u_d)$$

Where $\Delta P_e$ is the variation of direct-drive wind turbine generator output active power compared with the steady-state value, $\Delta\theta_{pll}$ is the variation of PLL angle, $\Delta i_d$, $\Delta i_q$, $\Delta u_q$ and $\Delta u_d$ are respectively the variation of d-axis and q-axis components of current and voltage at the terminal of direct-drive wind turbine generator, $\omega$ is the oscillation frequency of dq axis.

Furthermore, the calculation process of energy negative gradient includes:

step 1: discretizing the terminal energy:

$$\Delta W_{PMSG}(i) = \sum_{t=t_i}^{t_i+\frac{2\pi}{\omega}} \Delta W_{PMSG}(t).$$

The value of terminal energy of direct-drive wind turbine generator at the time $t_1, \ldots, t_n$, i.e. $\Delta W_{PMSG}(t_1), \ldots, \Delta W_{PMSG}(t_n)$ can be obtained; n is the number of data.

Step 2: calculating the energy negative gradient $\eta$ with discretized terminal energy $\Delta W_{PMSG}(t_1), \ldots, \Delta W_{PMSG}(t_n)$.

Furthermore, the step 2 includes:

calculating the discretized average value of the discretized terminal energy of direct-drive wind turbine generator by the following formula;

$$\Delta \overline{W}_{PMSG} = \frac{1}{n}\sum_{i=1}^{n}\Delta W_{PMSG}(i)$$

with the discretized terminal energy $\Delta W_{PMSG}(t_1), \ldots, \Delta W_{PMSG}(t_n)$ and its average value, obtaining the energy negative gradient by the following formula:

$$\eta = -\nabla\left[\frac{|\Delta W_{PMSG}(t) - \Delta \overline{W}_{PMSG}|}{\left(\frac{1}{n}\sum_{t=1}^{n}(\Delta W_{PMSG}(t) - \Delta \overline{W}_{PMSG})^2\right)^{\frac{1}{2}}}\right].$$

Where $\nabla[\cdot]$ is the symbol of gradient.

Furthermore, the stability level of the system can be assessed according to η: When η is positive, the system is stable and the bigger the value of η is, the higher the system stability level is; When η is zero, the system is critically stable; When η is negative, the system will go unstable, and as the absolute value of η increases, system stability level will drop.

Furthermore, the adjustment law of critical parameters affecting the stability of system can be obtained through the following steps:

step S1: applying the PLL dynamic function to the energy negative gradient expression, and obtaining the energy negative gradient with direct-drive wind turbine generator stability operation points and PLL critical parameters:

$$\eta_2 = -\left(I_{sd0}\omega\frac{\cos\varphi_c}{2} + I_{sq0}\omega\frac{\sin\varphi_c}{2}\right)$$

$$\left[A_-(t)\Omega_{u-}\alpha_u e^{\alpha_u t} + \frac{dA_-(t)}{dt}\Omega_{u-}e^{\alpha_u t}\right]\Big|_{t_0}^{t_0+\frac{2\pi}{\omega}} - U_{sd0}\omega$$

$$\frac{\cos(\varphi_c - \varphi_{RL})}{2}\left[A_-(t)\alpha_i\Omega_{i-}e^{\alpha_i t} + \frac{dA_-(t)}{dt}\Omega_{i-}e^{\alpha_i t}\right]\Big|_{t_0}^{t_0+\frac{2\pi}{\omega}} + \left(I_{sd0}\omega\frac{\cos\varphi_c}{2} + \right.$$

$$\left. I_{sq0}\omega\frac{\sin\varphi_c}{2}\right)\left[A_+(t)\Omega_{u+}\alpha_u e^{\alpha_u t} + \frac{dA_+(t)}{dt}\Omega_{u+}e^{\alpha_u t}\right]\Big|_{t_0}^{t_0+\frac{2\pi}{\omega}} + U_{sd0}\omega$$

$$\frac{\cos(\varphi_c - \varphi_{RL})}{2}\left[A_+(t)\alpha_i\Omega_{i+}e^{\alpha_i t} + \frac{dA_+(t)}{dt}\Omega_{i+}e^{\alpha_i t}\right]\Big|_{t_0}^{t_0+\frac{2\pi}{\omega}} - 2\omega K_{pll}^2\Omega_{u-}$$

$$\Omega_{u+}e^{\alpha_u t}\alpha_u\sin\varphi_c[I_{sd0}\sin(\varphi_{u+}+\varphi_{u-}) - I_{sq0}\cos(\varphi_{u+}+\varphi_{u-})]\Big|_{t_0}^{t_0+\frac{2\pi}{\omega}}.$$

Where $A_-$, $A_+$ respectively represent the amplitude of PLL angle variation $\Delta\theta_{pll}$ in sub-synchronous frequency and super-synchronous frequency; $I_{sd0}$, $I_{sq0}$, $U_{sd0}$, $U_{sq0}$ are the original value of d-axis and q-axis components of current and voltage at the terminal of direct-drive wind turbine generator; $\alpha_u$ and $\alpha_i$ are the attenuation coefficients of oscillation components of voltage and current; $\Omega_{u-}$, $\Omega_{u+}$, $\Omega_{i-}$ and $\Omega_{i+}$ are respectively the amplitude coefficients of sub/super synchronous components of voltage and current; $\varphi_{u-}$ and $\varphi_{u+}$ are the initial phase angles of sub-synchronous and super-synchronous voltage; $\varphi_{i-}$ and $\varphi_{i+}$ are the initial phase angles of sub-synchronous and super-synchronous currents; $\Omega_{u+}=\Omega_{i+}X_+$, $\Omega_{u-}=\Omega_{i-}X_-$, $\varphi_{u-}=\varphi_{i-}+\varphi_{RL}$ and $\varphi_{u+}=\varphi_{i+}+\varphi_{RL}$, where $\varphi_{RL}$ is the phase angle of transmission lines; $k_{p\theta}$ and $k_{i\theta}$ are the proportion gain and integration gain of PLL;

$$\varphi_c = \arctan\frac{\omega k_{p\theta}}{k_{i\theta}}, K_{pll} = \left|\frac{k_{p\theta}s + k_{i\theta}}{s^2 - U_{sq0}(k_{p\theta}s + k_{i\theta})}\right|_{s=j\omega};$$

Applying the dynamic function of system transmission lines to the energy negative gradient expression, and obtaining the following energy negative gradient with critical parameters of transmission lines:

$$\eta_1 = -2\Omega_{i+}\Omega_{i-}e^{2\alpha_i t}\alpha_i X_L\omega\sin(\varphi_{i+}+\varphi_{i-})\Big|_{t_0}^{t_0+\frac{2\pi}{\omega}} +$$

$$2[\Omega_{i-}^2 e^{2\alpha_i t}\alpha_i\omega R - \Omega_{i+}\Omega_{i-}e^{2\alpha_i t}\alpha_i R\omega\cos(\varphi_{i+}+\varphi_{i-})]\Big|_{t_0}^{t_0+\frac{2\pi}{\omega}}.$$

Where $\Omega_{i-}$ and $\Omega_{i+}$ are the amplitude coefficients of current sub-synchronous component and super-synchronous component respectively; $\alpha_i$ is the attenuation coefficients of oscillation components of current; R and $X_L$ are line resistance and the equivalent reactance of the transmission lines; $\varphi_{i-}$ and $\varphi_{i+}$ are respectively the initial phase angles of sub-synchronous and super-synchronous currents;

Step S2: based on the constructed energy negative gradient with the critical parameters of direct-drive wind turbine generator stability operation points and PLL, and the one with the transmission lines critical parameters, obtaining the influence pattern of these parameters on the energy negative gradient;

The influence patterns include: reducing $I_{sd0}$ or increasing $I_{sq0}$ helps to improve the stability level of system; The bigger R is and the smaller XL is, the more stable the system is; Reducing PLL parameters Kp and Ki, the system stability can be enhanced.

On another hand, the present embodiment proposes a stability evaluation system of direct-drive wind turbine generator, which includes a PMU, a first processor, a second processor, a third processor and result output terminal;

The PMU is used to collect the variation of voltage, current, active power and PLL angle at the terminal of direct-drive wind turbine generator;

The first processor is used to calculate the terminal energy of direct-drive wind turbine generator;

The second processor is used to assess the stability level of direct-drive wind turbine generator according to the value of energy negative gradient;

The third processor is used to analyze the influence pattern of direct-drive wind turbine generator stable operation points, PLL and transmission lines critical parameters on the energy negative gradient of direct-drive wind turbine generator and propose the adjustment law of critical parameters to improve the stability of the system;

The result output terminal is used to output the stability level of the system and adjustment law of the critical parameters affecting system stability.

Furthermore, the PMU equipped at the terminal of direct-drive wind turbine generator and PLL collects the variation of voltage, current, active power and PLL angle.

Furthermore, the first processor receives the data transferred by the PMU, the terminal energy of direct-drive wind turbine generator can be calculated based on the following formula:

$$\Delta W_{PMSG}(t) = \int_t^{t+\frac{2\pi}{\omega}}\Delta P_e d\Delta\theta_{pll} + \int_t^{t+\frac{2\pi}{\omega}}(\Delta i_d d\Delta u_q - \Delta i_q d\Delta u_d)$$

Where $\Delta P_e$ is the variation of direct-drive wind turbine generator output active power compared with the steady-state value; $\Delta\theta_{pll}$ is the variation of PLL angle; $\Delta i_d$, $\Delta i_q$, $\Delta u_q$ and $\Delta u_d$ are respectively the variation of d-axis and q-axis components of current and voltage at the terminal of direct-drive wind turbine generator, and ω is the oscillation frequency of dq axis.

Furthermore, the second processor assesses the stability level of system according to the value of η, including:

S1: discretizing the terminal energy:

$$\Delta W_{PMSG}(i) = \sum_{t=t_i}^{t_i+\frac{2\pi}{\omega}}\Delta W_{PMSG}(t).$$

The value of terminal energy of direct-drive wind turbine generator at the time, $t_1, \ldots t_n$, i.e. $\Delta W_{PMSG}(t_1), \ldots, \Delta W_{PMSG}(t_n)$ can be obtained; and n is the number of data;

S2: with discretized terminal energy $\Delta W_{PMSG}(t_1), \ldots, \Delta W_{PMSG}(t_n)$, calculating the energy negative gradient $\eta$, which includes the following steps in detail:

calculating the discretized average terminal energy of direct-drive wind turbine generator by the following formula:

$$\Delta \overline{W}_{PMSG} = \frac{1}{n}\sum_{i=1}^{n} \Delta W_{PMSG}(i).$$

Applying the discretized terminal energy $\Delta W_{PMSG}(t_1), \ldots, \Delta W_{PMSG}(t_n)$ and its average value to the following formula, and obtaining the energy negative gradient based on it;

$$\eta = -\nabla \left[ \frac{|\Delta W_{PMSG}(t) - \Delta \overline{W}_{PMSG}|}{\left(\frac{1}{n}\sum_{t=1}^{n}(\Delta W_{PMSG}(t) - \Delta \overline{W}_{PMSG})^2\right)^{\frac{1}{2}}} \right]$$

Where $\nabla[\cdot]$ is the symbol of gradient;

S3: assessing the stability level of system according to $\eta$: when $\eta$ is positive, the system is stable and the bigger the value of $\eta$ is, the higher the system stability level is; When $\eta$ is zero, the system is critically stable; When $\eta$ is negative, the system will go unstable, and as the absolute value of $\eta$ increases, system stability level will drop.

Compared with the prior technology, the application can realize at least one of the following beneficial effects:

1. The calculation of energy negative gradient can quantify the stability level of the system, realize the early warning of system oscillation and ensure the safe and stable operation of the power grid.

2. Through the terminal energy calculation module, the calculation amount can be reduced, the occurrence and development of oscillation can be analyzed in real time, the calculation error can be reduced, and the accurate operation of the system can be guaranteed.

3. The parameter analysis module can give the influence of power grid and generator side parameters on the oscillation stability level, realize the mutual cooperation between the stability level evaluation and parameter adjustment, and adjust the parameters based on the adjustment rules, so as to make the system stability meet the requirements and improve the working efficiency of the system.

4. Through the simulation experiment, the stability evaluation and parameter analysis under different oscillation scenarios are realized, which improves the security and reliability of the system.

In the application, the above technical schemes can be combined with each other to realize more preferred combination schemes. Other features and advantages of the application will be described in a subsequent specification, and some of the advantages may become apparent from the specification or be understood by implementing the application. The object and other advantages of the application can be realized and obtained through the contents specially pointed out in the specification and the drawings.

BRIEF DESCRIPTION OF DRAWINGS

The attached figures are only for the purpose of illustrating specific embodiments, and are not considered to be a limitation of the application. In the whole figures, the same reference symbols represent the same parts.

DESCRIPTION OF EMBODIMENTS

The preferred embodiments of the application will be described below in combination with the attached figures, where the attached figures form part of the application and, together with the embodiments of the application, are used to explain the principles of the application, not to define the scope of the application.

One embodiment of the application reveals a stability evaluation method of direct-drive wind turbine generator, including the following steps:

measuring the variation of voltage, current, active power and PLL (phase-looked-loop) angle at the terminal of direct-drive wind turbine generator in one oscillation period $$\frac{2\pi}{\omega};$$

based on the measurements of the variation, calculating the terminal energy of direct-drive wind turbine generator with the established terminal energy model of direct-drive wind turbine generator;

according to the calculated terminal energy of direct-drive wind turbine generator, obtaining the energy negative gradient of direct-drive wind turbine generator, and assessing the stable level of the system according to the value of energy negative gradient; and based on the influence pattern of the critical parameters of stable operation point of direct-drive wind turbine generator, PLL and transmission lines on the energy negative gradient, obtaining the adjustment law of the critical parameters that affect the stability of the system.

By calculating the energy negative gradient, the stable level of the system is quantified, the system oscillation warning is realized, and the safe and stable operation of the power grid is ensured. When the system stability level does not meet the requirements, parameters can be adjusted based on the adjustment law until the system stability meets the requirements.

Figure 1:
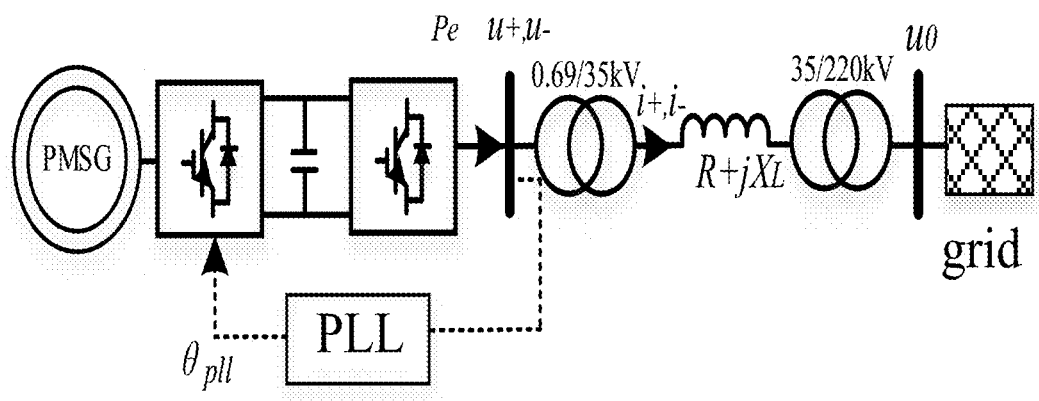
FIG. 1 is the structure diagram of direct-drive wind turbine generator integrated system in an embodiment.

Specifically, the structure of the system with direct-drive wind turbine generators integrated is shown in FIG. 1. Establish the terminal energy model of direct-drive wind turbine generators with the critical parameters of PLL and transmission lines, which is:

$$\Delta W_{PMSG}(t) = \int_t^{t+\frac{2\pi}{\omega}} \Delta P_e d\Delta\theta_{pll} + \int_t^{t+\frac{2\pi}{\omega}} (\Delta i_d d\Delta u_q - \Delta i_q d\Delta u_d).$$

Where $\Delta P_e$ is the variation of direct-drive wind turbine generator output active power of direct-drive wind turbine generator compared with the stable value, $\Delta\theta_{pll}$ is the variation of PLL angle, $\Delta i_d$, $\Delta i_q$, $\Delta u_q$ and $\Delta u_d$ are respectively the variation of d-axis and q-axis components of current and voltage at the terminal of direct-drive wind turbine generator, and $\omega$ is the oscillation frequency of dq axis.

By monitoring the terminal energy of direct-drive wind turbine generator, it can analyze the occurrence and development of oscillation in real time and reduce the calculation amount and calculation error. The calculation efficiency is high and it ensures the accurate operation of the system.

Preferably, the calculation process of energy negative gradient includes:

step 1: discretizing the terminal energy:

$$\Delta W_{PMSG}(i) = \sum_{t=t_i}^{t_i+\frac{2\pi}{\omega}} \Delta W_{PMSG}(t).$$

The value of terminal energy of direct-drive wind turbine generator at the time $t_1, \ldots t_n$, i.e. $\Delta W_{PMSG}(t_1), \ldots, \Delta W_{PMSG}(t_n)$ can be calculated; n is the number of data.

Step 2: with discretized terminal energy $\Delta W_{PMSG}(t_1), \ldots, \Delta W_{PMSG}(t_n)$ to calculate the energy negative gradient $\eta$, which includes the following steps in detail.

Calculating the average value of the discretized terminal energy of direct-drive wind turbine generator by the following formula:

$$\Delta \overline{W}_{PMSG} = \frac{1}{n}\sum_{i=1}^{n} \Delta W_{PMSG}(i).$$

With the discretized terminal energy $\Delta W_{PMSG}(t_1), \ldots, \Delta W_{PMSG}(t_n)$ and the average value, the energy negative gradient can be obtained based on the following formula.

$$\eta = -\nabla\left[\frac{|\Delta W_{PMSG}(t) - \Delta \overline{W}_{PMSG}|}{\left[\left(\frac{1}{n}\sum_{t=1}^{n}(\Delta W_{PMSG}(t) - \Delta \overline{W}_{PMSG})^2\right)^{\frac{1}{2}}\right]}\right]$$

Where $\nabla[\cdot]$ is the symbol of gradient.

Step 3: assessing the stability according to $\eta$: when $\eta>0$, the system is stable, and the bigger the value of $\eta$ is, the higher the system stability level is. when $\eta=0$, the system is critically stable. when $\eta<0$, the system will go unstable, and as the absolute value of $\eta$ increases, the system stability level will drop.

$\eta$ being positive or negative respectively represents the ascending or descending trend of dynamic energy of direct-drive wind turbine generator, i.e. the system being stable or unstable. The absolute value of $\eta$ represents the ascending or descending speed of dynamic energy. When $\eta$ is positive, the bigger the absolute value of $\eta$ is, the higher the descending amount of dynamic energy per unit time is, and the faster system oscillation converges, the higher system stability level is. Conversely, the smaller the absolute value of $\eta$ is, the more slowly system oscillation converges, and the lower system stability level is. When $\eta$ is negative, the system will go unstable, and as the absolute value of $\eta$ increases, the system stability level will drop and system oscillation will deteriorate. Therefore, the stable level of sub/super synchronous oscillation of the system can be assessed quantitatively according to the energy negative gradient $\eta$.

Through the energy negative gradient of direct-drive wind turbine generator, the stability of the system can be judged more quickly and effectively, the real-time monitoring of dynamic energy can be realized, and the working efficiency of the system can be improved.

Preferably, the adjustment law of the critical parameters affecting the stability of the system include:

step S1: applying the PLL dynamic function to the energy negative gradient expression, the detailed expression with critical parameters of stable operating points and the PLL can be achieved:

$$\eta_2 =$$

$$-\left(I_{sd0}\omega\frac{\cos\varphi_c}{2} + I_{sq0}\omega\frac{\sin\varphi_c}{2}\right)\left[A_-(t)\Omega_{u-}\alpha_u e^{\alpha_u t} + \frac{dA_-(t)}{dt}\Omega_{u-}e^{\alpha_u t}\right]\Big|_{t_0}^{t_0+\frac{2\pi}{\omega}} -$$

$$U_{sd0}\omega\frac{\cos(\varphi_c - \varphi_{RL})}{2}\left[A_-(t)\alpha_i\Omega_{i-}e^{\alpha_i t} + \frac{dA_-(t)}{dt}\Omega_{i-}e^{\alpha_i t}\right]\Big|_{t_0}^{t_0+\frac{2\pi}{\omega}} +$$

$$\left(I_{sd0}\omega\frac{\cos\varphi_c}{2} + I_{sq0}\omega\frac{\sin\varphi_c}{2}\right)\left[A_+(t)\Omega_{u+}\alpha_u e^{\alpha_u t} + \frac{dA_+(t)}{dt}\Omega_{u+}e^{\alpha_u t}\right]\Big|_{t_0}^{t_0+\frac{2\pi}{\omega}} +$$

$$U_{sd0}\omega\frac{\cos(\varphi_c - \varphi\phi_{RL})}{2}\left[A_+(t)\alpha_i\Omega_{i+}e^{\alpha_i t} + \frac{dA_+(t)}{dt}\Omega_{i+}e^{\alpha_i t}\right]\Big|_{t_0}^{t_0+\frac{2\pi}{\omega}} -$$

$$2\omega K_{pll}^2\Omega_{u-}\Omega_{u+}e^{2\alpha_u t}\alpha_u\sin\varphi_c[I_{sd0}\sin(\varphi_{u+} + \varphi_{u-}) - I_{sq0}\cos(\varphi_{u+} + \varphi_{u-})]\Big|_{t_0}^{t_0+\frac{2\pi}{\omega}}$$

Where $A_-$, $A_+$ respectively represent the amplitude of PLL angle variation $\Delta\theta_{pll}$ in sub-synchronous frequency and super-synchronous frequency. $I_{sd0}$, $I_{sq0}$, $U_{sd0}$, $U_{sq0}$ are the original value of dq axes components of current and voltage of the direct-drive wind turbine generator terminal. $\alpha_u$ and $\alpha_i$ are the attenuation coefficients of oscillation components of voltage and current. $\Omega_{u-}$, $\Omega_{u+}$, $\Omega_{i-}$ and $\Omega_{i+}$ are respectively the amplitude coefficients of sub/super synchronous components of voltage and current. $\varphi_{u-}$ and $\varphi_{u+}$ are the initial phase angles of sub-synchronous and super-synchronous voltages. $\varphi_{i-}$ and $\varphi_{i+}$ are the initial phase angles of sub-synchronous and super-synchronous currents. $\Omega_{u+}=\Omega_{i+}X_+$, $\Omega_{u-}=\Omega_{i-}X_-$, $\varphi_{u-}=\varphi_{i-}+\varphi_{RL}$ and $\varphi_{u+}=\varphi_{i+}+\varphi_{RL}$, where $\varphi_{RL}$ is the phase angle of transmission lines. $k_{p\theta}$ and $k_{i\theta}$ are the proportion gain and integration gain of PLL.

$$\varphi_c = \arctan\frac{\omega k_{p\theta}}{k_{i\theta}},$$

$$K_{pll} = \left|\frac{k_{p\theta}s + k_{i\theta}}{s^2 - U_{sq0}(k_{p\theta}s + k_{i\theta})}\right|_{s=j\omega}.$$

Applying the dynamic function of transmission lines to expression of the energy negative gradient, the one with transmission lines parameters can be expressed as:

$$\eta_1 = -2\Omega_{i+}\Omega_{i-}e^{2\alpha_i t}\alpha_i X_L \omega \sin(\varphi_{i+} + \varphi_{i-})\Big|_{t_0}^{t_0+\frac{2\pi}{\omega}} +$$
$$2[\Omega_{i-}^2 e^{2\alpha_i t}\alpha_i \omega R - \Omega_{i+}\Omega_{i-}e^{2\alpha_i t}\alpha_i R\omega\cos(\varphi_{i+} + \varphi_{i-})]\Big|_{t_0}^{t_0+\frac{2\pi}{\omega}}.$$

Where $\Omega_{i-}$ and $\Omega_{i+}$ are respectively the amplitude coefficients of sub-synchronous component and super-synchronous component of current. $\alpha_i$ is the attenuation coefficients of oscillation components of current. R and $X_L$ are line resistance and the equivalent reactance of the transmission network. $\varphi_{i-}$ and $\varphi_{i+}$ are the initial phase angles of sub-synchronous and super-synchronous currents.

Step S2: based on the constructed energy negative gradient with the critical parameters of stable operating points and PLL and the one with the critical parameters of the transmission lines, the influence pattern of these parameters on the energy negative gradient can be analyzed.

The analysis process of the influence pattern includes:

The first two items of the above energy negative gradient model with critical parameters of transmission lines are relevant to only line reactance $X_L$. Since $$e^{2\alpha_i t}\alpha_i\Big|_{t_0}^{t_0+\frac{2\pi}{\omega}}$$

is constantly above 0, this component of line energy negative gradient is constantly below 0. According to the energy negative gradient model with grid parameters, the bigger $X_L$ is, the weaker power grid strength is, the smaller line energy negative gradient is, and the lower the system stability level is.

The last two items of the above energy negative gradient model with critical parameters of transmission lines are relevant to only line parameter R, and the value of this component is affected by the amplitude coefficients of sub/super synchronous currents. When sub-synchronous component of the system is dominant, i.e. when $\Omega_{i-} > \Omega_{i+}$, the component of line energy negative gradient corresponding to the resistance R is constantly positive, and the bigger the resistance R is, the bigger line energy negative gradient is. When super-synchronous component is dominant, the energy negative gradient generated by the resistance R can be determined by the value (that is, plus or minus sign of the value) of $\Omega_{i-}-\Omega_{i+}\cos(\varphi_{i+}+\varphi_{i-})$. In order to obtain the values of $\Omega_{i-}$ and $\Omega_{i+}\cos(\varphi_{i+}+\varphi_{i-})$, the expression of $\cos(\varphi_{i+}+\varphi_{i-})$ is further analyzed.

$$\varphi_{i+} + \varphi_{i-} \approx \Delta\theta_{pll} + \varphi_{RL} + \frac{\pi}{2}.$$

Where $\varphi_{i-}$ and $\varphi_{i+}$ are the initial phase angles of sub-synchronous and super-synchronous currents. $\Delta\theta_{pll}$ is the variation of PLL angle. $\varphi_{RL}$ is the impedance angle of transmission lines.

The value of $\cos(\varphi_{i+}+\varphi_{i-})$ is mainly determined by $\Delta\theta_{pll}$ and $\varphi_{RL}$. On the one hand, $\Delta\theta_{pll}$ is mainly affected by PLL parameters. Currently, PLL usually applies fixed voltage phase control, thus $K_{p\theta} \ll K_{i\theta}$ and the value of $\Delta\theta_{pll}$ is relatively small during sub/super synchronous oscillation. On the other hand, in order to reduce the transmission loss on transmission lines, the value of transmission lines resistance R is usually small, especially in long-distance transmission cases $R \ll X_L$. Therefore, $\Delta\theta_{pll}+\varphi_{RL} \approx 0$ and the value of $\cos(\varphi_{i+}+\varphi_{i-})$ is approximately 0 and constantly smaller than $$\frac{\Omega_{i-}}{\Omega_{i+}}.$$

Thus, according to the energy negative gradient model with grid parameters, the energy negative gradient of line generated by R is positive, and as R increases, the energy negative gradient also increases, and the stable level of the system improves.

Based on the above analysis, in two scenarios where sub-synchronous and super-synchronous is dominate, the energy negative gradient generated by line resistance is constantly positive and increases as R increases.

The first two items of the energy negative gradient model with PLL are energy negative gradient item being relevant to only sub-synchronous components and are denoted as $\eta_-$; the following two items are energy negative gradient item being relevant to only super-synchronous components and are denoted as $\eta_+$; the last item is affected by both sub-synchronous and super-synchronous components, which represents the coupling effect between sub-synchronous components and super-synchronous components generated by PLL dynamic characteristics and is denoted as $\eta_{-\cap+}$. With the above three parts synthesized, the energy negative gradient model with PLL can be written as:

$$\eta_2 = -\eta_- + \eta_+ + \eta_{-\cap+}$$

When sub-synchronous oscillation is dominant in the system, $\eta_+ - \eta_- < 0$. Since direct-drive wind turbine generator operates normally under condition of the unity power factor i.e. $I_{sd0} \gg I_{sq0}$, $\eta_{-\cap+} < 0$, i.e. the coupled energy negative gradient generated by PLL is constantly negative. In this case, according to the energy negative gradient model with PLL, $\eta_2$ is constantly below 0, and the energy negative gradient generated by PLL is constantly negative. If PLL parameters $K_p$ and $K_i$ are increased, $\eta_2$ will decrease and the stable level of the system will drop.

When super-synchronous oscillation is dominant in the system, $\eta_+ - \eta_- > 0$ and the coupled energy negative gradient generated by PLL $\eta_{-\cap+}$ is constantly negative. According to the energy negative gradient model with PLL, the value (that is, plus or minus sign of the value) of $\eta_2$ is determined by the values of $\eta_{-\cap+}$ and $\eta_{+}-\eta_{-}$. When $\eta_{-\cap+}>\eta_{-}-\eta_{+}$, the energy negative gradient generated by PLL is positive; otherwise, the energy negative gradient generated by PLL is negative. PLL parameters affect the energy negative gradient by changing $K_{pll}$ in $A_{-}$ and $A_{+}$. If PLL parameters $K_p$ and $K_i$ are increased, $K_{pll}$ will increase, $\eta_{+}-\eta_{-}$ will also increase, but $\eta_{-\cap+}$ will decrease. Furthermore, according to the energy negative gradient model with PLL, $\eta_{-\cap+}$ is inversely proportional to $K_{pll}^2$, and as PLL control parameters vary, the decreasing amplitude of $\eta_{-\cap+}$ is larger than the increasing amplitude of $\eta_{+}-\eta_{-}$, thus $\eta_2$ as a whole exhibits decreasing trend. Based on the two scenarios of sub-synchronous oscillation or super-synchronous oscillation being dominant, increasing PLL parameters will lower the stable level of power system integrated with direct-drive wind turbine generator.

It can be seen from the energy negative gradient model with PLL that, the energy negative gradient of PLL is also affected by current parameters at the equilibrium point of wind turbine, i.e. $I_{sd0}$ and $I_{sq0}$, which are determined by the reference values of grid-side converter of direct-drive wind turbine generator.

When sub-synchronous component is dominant, $\eta_2<0$, and according to the energy negative gradient model of PLL, the energy negative gradient of PLL will decrease as $I_{sd0}$ increases and increase as $I_{sq0}$ increases.

When super-synchronous component is dominant, due to the limits of wind turbine LVRT (Low voltage ride through) and HVRT (High voltage ride through), the PLL bandwidth of direct-drive wind turbine generator cannot be set too low, thus the value of $K_{pll}$ in super-synchronous frequency band is relatively large. In this case, according to the model of the energy negative gradient of PLL, $\eta_{-\cap+}<\eta_{-}-\eta_{+}$, i.e. $\eta_2<0$. If $I_{sd0}$ is increased, the energy negative gradient of PLL will further decrease, aggravating the stable level of the system. On the other hand, if $I_{sq0}$ is increased, $\eta_{+}-\eta_{-}$ will also increase, the absolute value of $\eta_{-\cap+}$ will decrease, $\eta_2$ will increase, and the stable level of the system will be improved. Therefore, based on the two cases of sub-synchronous oscillation or super-synchronous oscillation being dominant respectively, moderately decreasing $I_{sd0}$ and increasing $I_{sq0}$ will improve the stable level of the system.

Based on the above analysis, the influence patterns are included: Reducing Isd0 or increasing Isq0 help improve the stable level of the system. The bigger R is and the smaller XL is, the more stable the system is. Reducing PLL parameters $K_p$ and $K_i$, the system stability can be enhanced.

Through parameter analysis, the influence of power grid and generator side parameters on the level of oscillation stability is given. The coordination of stable level evaluation and parameter adjustment is realized, and the working efficiency of the system is improved.

Figure 2:
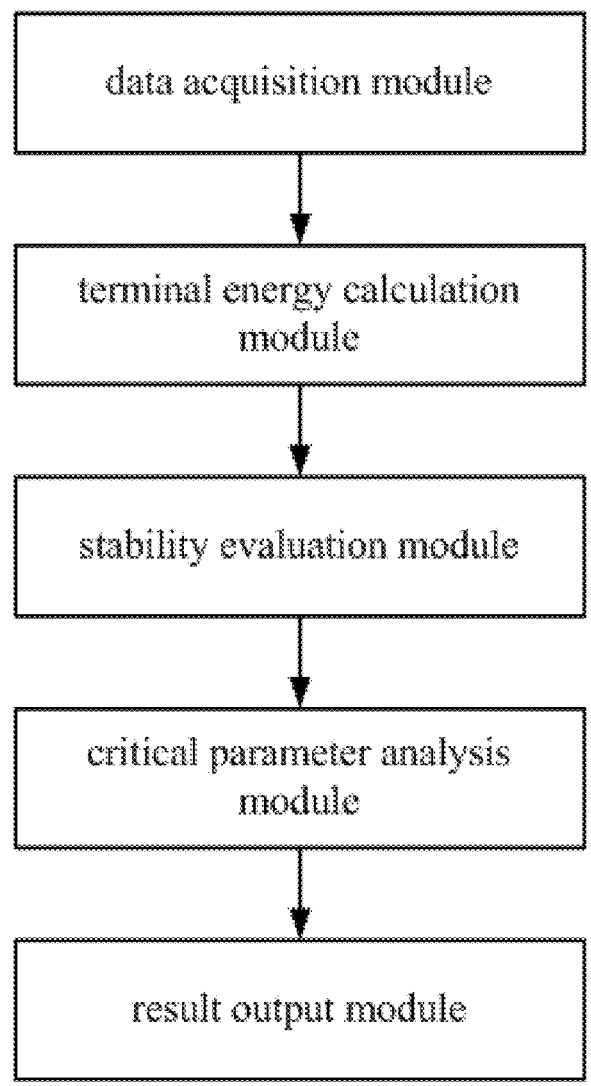
FIG. 2 is the structure diagram of a stability evaluation system of direct-drive wind turbine generator in another embodiment.

Another embodiment of the application is shown in FIG. 2, which provides a stability evaluation system of direct-drive wind turbine generator, including a data acquisition module, a terminal energy calculation module, a stability evaluation module, a critical parameter analysis module and a result output module. Wherein the data acquisition is implemented by the PMU, the terminal energy calculation is implemented by a first processor, the stability evaluation is implemented by a second processor, critical parameter analysis is implemented by a third processor and the result output is implemented by the result output terminal. Each of the first processor, the second processor and the third processor is independent processor, or the three processors are integrated in a single processor. The data acquisition module is used to collect the variation of voltage, current, active power and PLL angles at the terminal of direct-drive wind turbine generator. The terminal energy calculation module is used to calculate the terminal energy of direct-drive wind turbine generator. The stability evaluation module is used to assess the stable level of direct-drive wind turbine generator according to the value of energy negative gradient. The critical parameter analysis module is used to analyze the influence patterns of stable operation point of direct-drive wind turbine generator, PLL and transmission lines parameters on the energy negative gradient and propose the adjustment law of critical parameters to improve the stability of the system. The result output module is used to output the stability level of direct-drive wind turbine generator and adjustment law of the critical parameters affecting system stability.

By measuring the variation of terminal voltage, current, active power and locked phase angle at the terminal of direct-drive wind turbine generator, the system can effectively monitor the stable level of sub/super synchronous oscillations in the grid connected system of direct-drive wind turbine generator, and reveal the influence pattern of system parameters on the stable level. Based on the influence law, the parameters can be adjusted to improve the stability and safety of the system.

Optimally, the data acquisition module collects the variation of voltage, current, active power and PLL angles by the PMU (Phasor Measurement Unit) equipped at the terminal of direct-drive wind turbine generator and PLL. Through the data acquisition module, the comprehensiveness and accuracy of data acquisition are realized.

Optimally, the terminal energy calculation module receives the data transferred by data acquisition module. And the terminal energy of direct-drive wind turbine generator can be calculated:

$$\Delta W_{PMSG}(t) = \int_{t}^{t+\frac{2\pi}{\omega}} \Delta P_e d\Delta\theta_{pll} + \int_{t}^{t+\frac{2\pi}{\omega}} (\Delta i_d d\Delta u_q - \Delta i_q d\Delta u_d)$$

Where $\Delta P_e$ is the variation of direct-drive wind turbine generator output active power compared with the stable value. $\Delta\theta_{pll}$ is the variation of PLL angle. $\Delta i_d$, $\Delta i_q$, $\Delta u_q$ and $\Delta u_d$ are respectively the variation of d-axis and q-axis components of current and voltage at the terminal of direct-drive wind turbine generator. $\omega$ is the oscillation frequency of dq axis.

Through the terminal energy calculation module, the calculation amount is reduced, the occurrence and development of oscillation can be analyzed in real time, the calculation error is reduced, and the accurate operation of the system is guaranteed.

Optimally, the stability evaluation module can assess the stable level of the system according to $\eta$, including:

step S1: discretizing the terminal energy:

$$\Delta W_{PMSG}(i) = \sum_{t=t_i}^{t_i+\frac{2\pi}{\omega}} \Delta W_{PMSG}(t).$$

The value of terminal energy of direct-drive wind turbine generator at the time, $t_1, \ldots t_n$, i.e. $\Delta W_{PMSG}(t_1), \ldots, \Delta W_{PMSG}(t_n)$ can be calculated. n is the number of data.

Step S2: with discretized terminal energy $\Delta W_{PMSG}(t_1), \ldots, \Delta W_{PMSG}(t_n)$, calculating the energy negative gradient η, which includes the following steps.

Calculating the average of the discretized terminal energy of direct-drive wind turbine generator by the following formula:

$$\Delta \overline{W}_{PMSG} = \frac{1}{n}\sum_{i=1}^{n}\Delta W_{PMSG}(i).$$

With the discretized terminal energy $\Delta W_{PMSG}(t_1), \ldots, \Delta W_{PMSG}(t_n)$ and its average value, the energy negative gradient can be obtained by the following formula.

$$\eta = -\nabla\left[\frac{|\Delta W_{PMSG}(t) - \Delta \overline{W}_{PMSG}|}{\left(\frac{1}{n}\sum_{t=1}^{n}(\Delta W_{PMSG}(t) - \Delta \overline{W}_{PMSG})^2\right)^{\frac{1}{2}}}\right]$$

Where ∇[□] is the symbol of gradient.

Step S3: the stable level of system can be assessed according to η. When η is positive, the system is stable and the bigger the value of η is, the higher system stability level is. When η=0, the system is critically stable. When η is negative, the system will go unstable, and as the absolute value of η increases, system stability level will drop.

The stability evaluation module can judge the stability of the system quickly and accurately, improve the working efficiency of the system, and ensure the stable operation of the system.

To verify the feasibility of the above proposed method, the simulation system integrated with direct-drive wind turbine generators has been constructed. With direct-drive wind turbine generators operating under the condition of different PLL parameters, transmission lines parameters, the stable level of system can be assessed, corresponding parameters can be adjusted so that the system is stable, and the stability assessment results are verified by simulation experiments.

Figure 3:
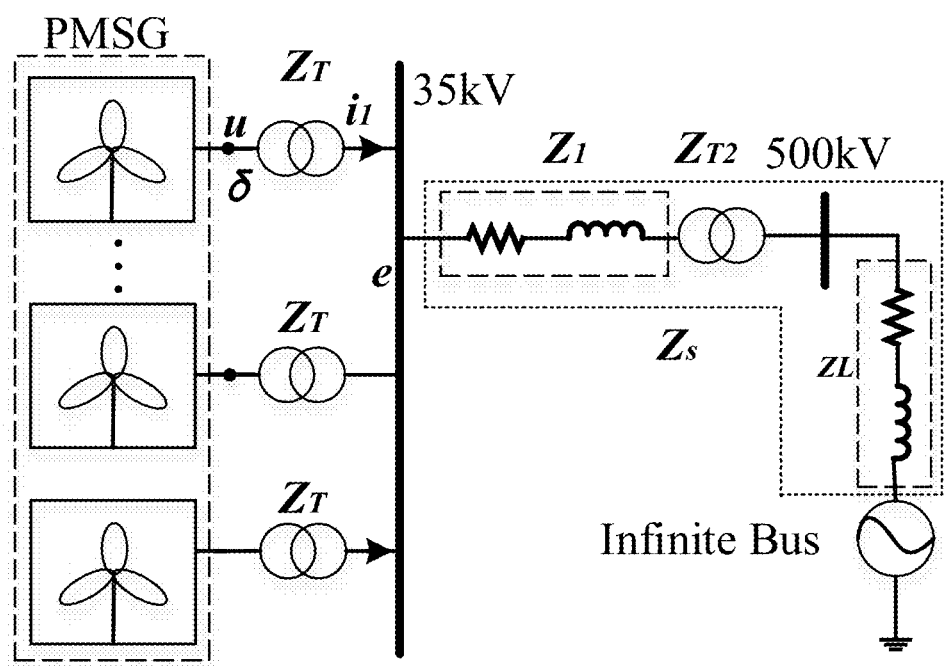
FIG. 3 is the simulation structure diagram of a stability evaluation system of direct-drive wind turbine generator in another embodiment.

Specifically, the simulation structure of the system is shown in FIG. 3. The model of power system integrated with direct-drive wind turbine generators (it is PMSG (Permanent Magnetic Synchronous Generator) in FIG. 3) is constructed in RT-LAB. Parameter settings of power system integrated with direct-drive wind turbine generator are shown in Table 1:

TABLE 1

Parameter settings of power system integrated with direct-drive wind farm

| Parameter | Symbol | Value |
|---|---|---|
| PMSG current inner loop proportion gain | $k_{p1}$/p.u. | 0.201 |
| PMSG current inner loop integration gain | $k_{i1}$/p.u. | 40.2 |
| PMSG PLL proportion gain | $k_{p\theta}$/p.u. | 1 |
| PMSG PLL integration gain | $k_{i\theta}$/p.u. | 40 |
| Amplitude of sub synchronous component of voltage at PCC | $\Omega_{u-}$/p.u. | 0.95 |
| Amplitude of sub synchronous component of current at PCC | $\Omega_{i-}$/p.u. | 1.0834 |
| Amplitude of super synchronous component of voltage at PCC | $\Omega_{u+}$/p.u. | 0.969 |
| Amplitude of super synchronous component of current at PCC | $\Omega_{i+}$/p.u. | 1.107 |

TABLE 1-continued

Parameter settings of power system integrated with direct-drive wind farm

| Parameter | Symbol | Value |
|---|---|---|
| Phase of sub synchronous component of voltage at PCC | $\varphi_{U-}$/deg | −0.0125 |
| Phase of sub synchronous component of current at PCC | $\varphi_{I-}$/deg | 19.2779 |
| Filter inducance | L/H | 2e-3 |

Considering different operation points, PLL and transmission lines parameters, the operating results of stability assessment module are shown as follows.

Three groups of parameters, i.e. Isq0=1, Isd0=1.3, Isq0=1.3, Isd0=1.3; Isq0=1.3, Isd0=1 are selected for time-domain simulation tests, and the corresponding calculated values of energy negative gradient are shown in Table 2:

TABLE 2

Parameter settings of time-domain simulation and calculated results of energy negative gradient

| Parameters | energy negative gradient | Oscillation characteristic |
|---|---|---|
| Isq0 = 1, Isd0 = 1.3 | −1.02 | Diverging to instability |
| Isq0 = 1.3, Isd0 = 1.3 | −0.73 | Diverging slowly |
| Isq0 = 1.3, Isd0 = 1 | 0.0503 | Converging to stability |

Figure 4:
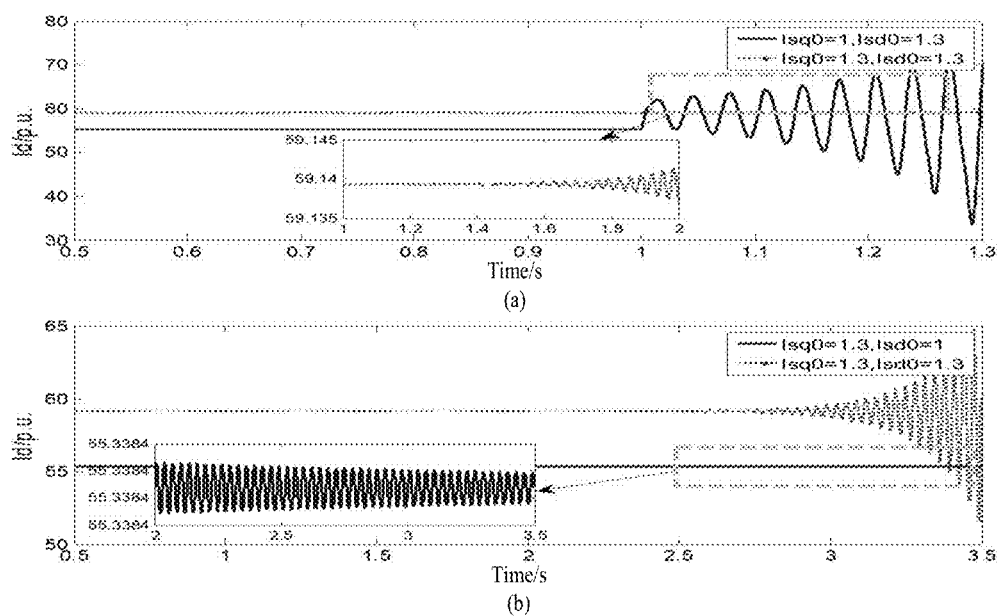
FIG. 4 is time-domain simulation diagram of different wind turbines at stable operating points in another embodiment.

Time-domain simulation of direct-drive wind turbine generator at different stable operating points are shown in FIG. 4. It can be seen from FIG. 4(a) that, when Isq0 increases from 1 to 1.3, the amplitude of system oscillation obviously decreases, and the stable level of the system improves. However, in the case of Isq0=1.3, Isd0=1.3, system oscillation still exhibits diverging trend, and the stable level of the system is still negative, which is consistent with the calculated value of energy negative gradient shown in Table 2. According to FIG. 4(b), when Isd0 increases from 1 to 1.3, system oscillation turns from converging to diverging, and system stability level drops acutely. Based on the analysis of calculated values in Table 2, the value of energy negative gradient decreases from 0.0503 to −0.73, the system turns from converging rapidly to diverging slowly, which is consistent with the stability level analysis results from time domain simulation.

Four groups of PLL parameter settings are selected for time-domain simulation tests. The settings of parameters and the corresponding calculated values of energy negative gradient are shown in Table 3.

TABLE 3

Parameter settings of time-domain simulation and calculated results of energy negative gradient

| Parameters | energy negative gradient | Oscillation characteristic |
|---|---|---|
| Kp = 1.85, Ki = 100 | −0.9 | Diverging acutely |
| Kp = 1.15, Ki = 100 | −0.0723 | Diverging slowly |
| Kp = 1.2, Ki = 125 | −0.92 | Diverging acutely |
| Kp = 1.2, Ki = 55 | −0.04 | Diverging slowly |

Figure 5:
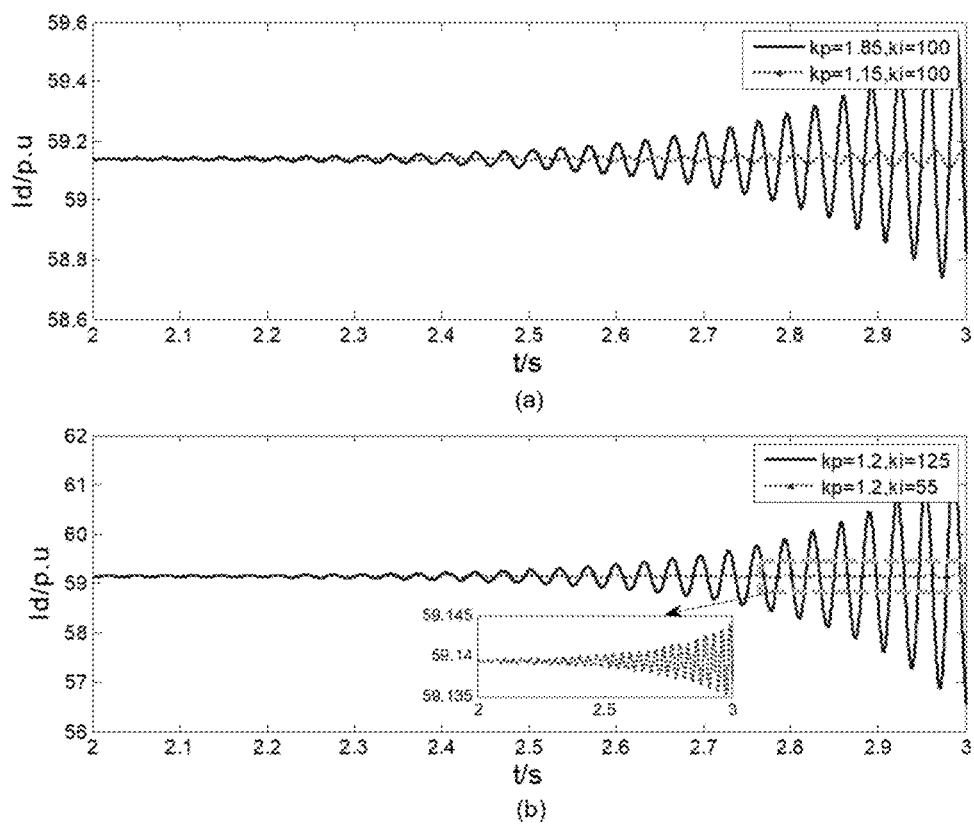
FIG. 5 is time-domain simulation diagram for different PLL parameters in another embodiment.

Time-domain simulation for different PLL parameters are shown in FIG. 5. FIG. 5(a) shows the time-domain simulation curves of d-axis current when Ki=100, Kp=1.85 and Ki=100, Kp=1.15. It can be seen that, as Kp decreases from 1.85 to 1.15, the amplitude of system oscillation obviously drops, the diverging trend slows down, and system stability level improves. In Table 3, the calculated values of energy negative gradient corresponding to parameter settings of Kp=1.85, Ki=100, Kp=1.15 are respectively−0.9 and −0.0723, with stability analysis results being diverging acutely and diverging slowly, which are consistent with the variation trends of time-domain simulation curves. When Kp=1.2, Ki=125 and Kp=1.2, Ki=55, time-domain simulation curves of d-axis current are shown in FIG. 5(b). It can be seen that, as Ki decreases, diverging of system oscillation obviously slows down, and system stability level improves. In Table 3, the calculated values of energy negative gradient corresponding to parameter settings of Kp=1.2, Ki=125 and Kp=1.2, Ki=55 are respectively−0.92 and −0.04, which are also consistent with the diverging trends of time-domain simulation curves.

Four groups of grid parameter settings are selected for time-domain simulation tests. The settings of parameters and the corresponding calculated values of energy negative gradient are shown in Table 4.

TABLE 4

Parameter settings of time-domain simulation and calculated results of energy negative gradient

| Parameters | energy negative gradient | Oscillation characteristic |
|---|---|---|
| R = 0.018, XL = 1.13 | −0.2526 | Diverging to instability |
| R = 0.15, XL = 1.13 | 0.04271 | Converging to stability |
| R = 0.15, XL = 1 | 0.02364 | Converging to stability |
| R = 0.15, XL = 2.5 | −0.1764 | Diverging to instability |

Figure 6:
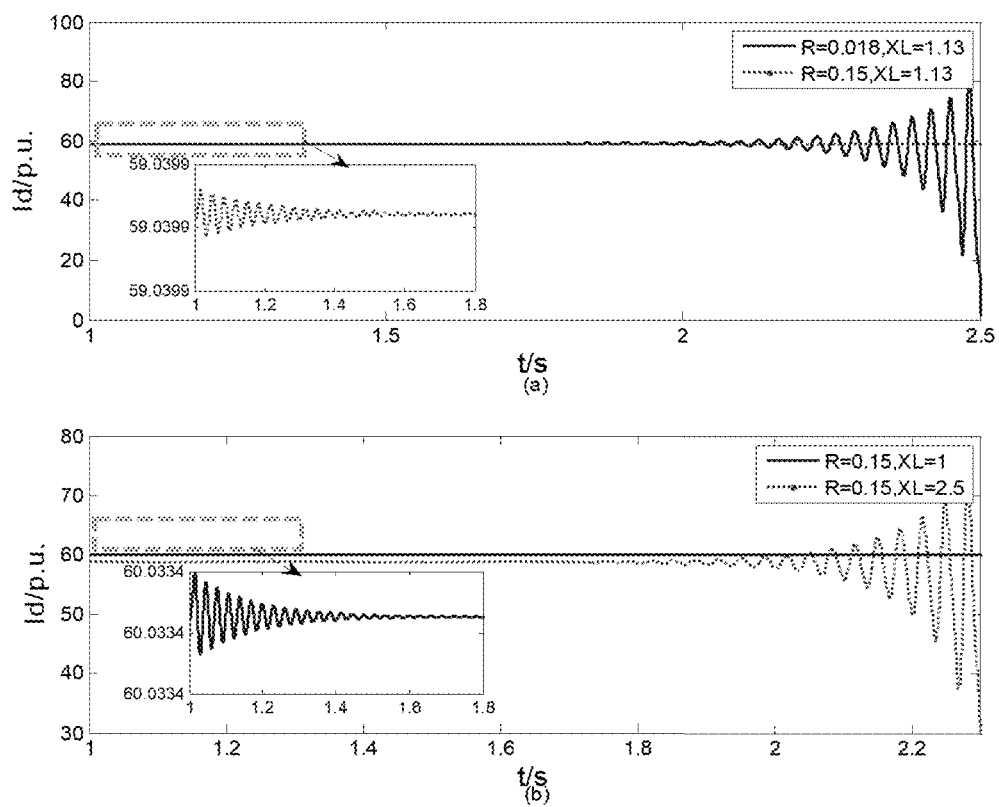
FIG. 6 is time-domain simulation diagram under different grid parameters in another embodiment.

Time-domain simulation diagrams under different grid parameters are shown in FIG. 6. It can be seen from FIG. 6(a) that, when line resistance R increases from 0.018 p.u. to 0.15 p.u., system oscillation turns from diverging acutely to converging obviously, and system stability level improves. the calculated values of energy negative gradient corresponding to the first two groups of parameters in Table 4, are respectively−0.2526 and 0.04271, which are consistent with the variation trends of time-domain simulation curves. According to FIG. 6(b), when grid equivalent reactance increases from 1 p.u. to 2.5 p.u., system oscillation turns from converging to diverging, and system stability level drops acutely. the calculated values of energy negative gradient corresponding to the last two groups of parameters in Table 4 are respectively 0.02364 and −0.1764, which are consistent with the variation trends of time-domain simulation results.

Critical parameters analysis module analyzes the influence of different parameters on system stability. The operating results are shown as follows.

Figure 7:
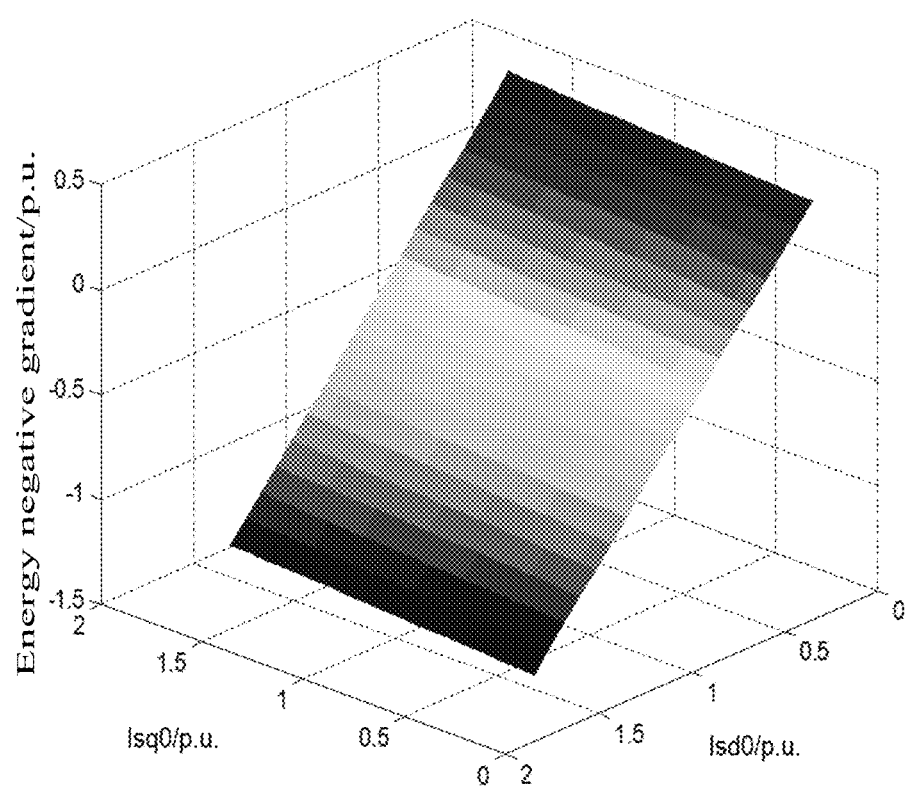
FIG. 7 is the diagram of the energy negative gradient of direct-drive wind turbine generator at different stable operating points in another embodiment.

When Isd0 and Isq0 increase from 0.16 to 1.67 in the step of 0.08, the variation trend of the energy negative gradient is depicted, as shown in FIG. 7. It can be seen that, the energy negative gradient of system is mainly affected by Isd0. As Isd0 increases, the energy negative gradient drops significantly. The effect of Isq0 on the energy negative gradient of system is relatively small. As Isq0 increases, the energy negative gradient of system slightly increases, and system stability level improves.

Figure 8:
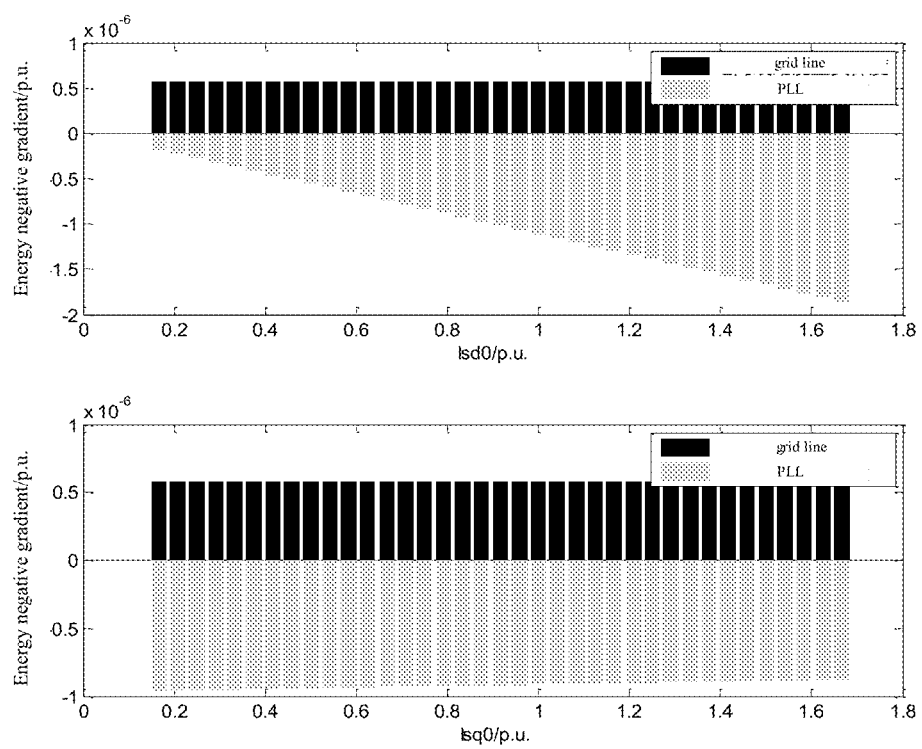
FIG. 8 is the change diagram of energy negative gradient components of direct-drive wind turbine generator at different stable operating points in another embodiment.

The variation trends of components of energy negative gradient corresponding to different stable operating points of direct-drive wind turbine generator are shown in FIG. 8. It can be seen that, when Isq0=1.08 and Isd0 increases, and the energy negative gradient of lines scarcely varies, while the energy negative gradient of PLL decreases, gradually offsetting the positive dissipation effect of transmission line and causing system stability level to drop. When Isd0=1.08 and Isq0 increases, the energy negative gradient of PLL increases, and system stability level gradually improves.

Figure 9:
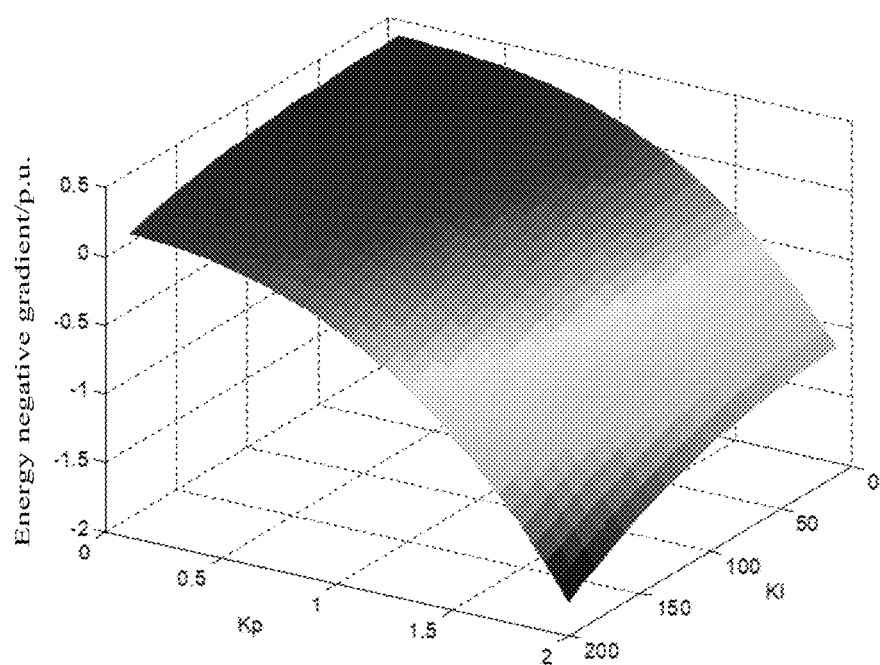
FIG. 9 is diagram of the energy negative gradient of direct-drive wind turbine generator for different PLL parameters in another embodiment.

With the other system operation parameters remaining unchanged, PLL parameter Kp increases from 0.1 to 2 in the step of 0.05, and parameter Ki increase from 10 to 200 in the step of 5, and the energy negative gradient corresponding to different parameters can be calculated, the results is shown in FIG. 9. It can be seen that, when Kp<1 and Ki<115, the energy negative gradient of system is positive, i.e. the system is stable. As Kp and Ki gradually increase, the energy negative gradient of the system decreases.

Figure 10:
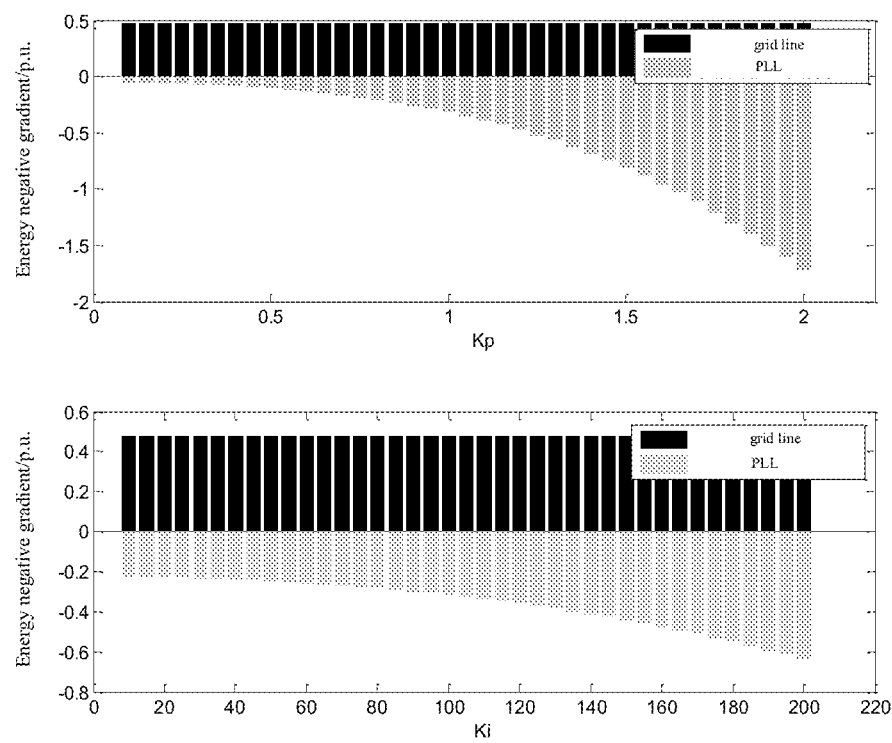
FIG. 10 is the change diagram of energy negative gradient components of direct-drive wind turbine generator for different PLL parameters in another embodiment.

FIG. 10 shows the variation of two components of energy negative gradient of direct-drive wind turbine generator corresponding to different values of PLL parameters. When Ki=100 and the value of Kp varies, the variation curves of energy negative gradient of lines and that of PLL are shown in FIG. 10(a). As shown in figure, in the one hand, the energy negative gradient of line parameters is positive and scarcely affected by PLL parameters; in the other hand, the energy negative gradient of PLL is negative and gradually decreases as Kp increases, the positive dissipation effect of transmission lines can be offset and the overall stable level of system can be lowered. When Kp=1, energy negative gradient varies with distinct variation of Ki, the variation curves of energy negative gradient of lines and that of PLL are shown in FIG. 10(b). It can be seen that, the energy negative gradient of lines is positive and gradually decreases as Ki increases. This is because the proportion of super-synchronous component is raised when PLL parameter increases, the energy negative gradient of lines is caused to drop. On the other hand, the energy negative gradient of PLL is negative and decreases as Ki increases. The decreasing amplitude of energy negative gradient of PLL is much larger than that of energy negative gradient of lines, thus the energy negative gradient of system overall exhibits descending trend, and stability level of the system drops as Ki increases.

Figure 11:
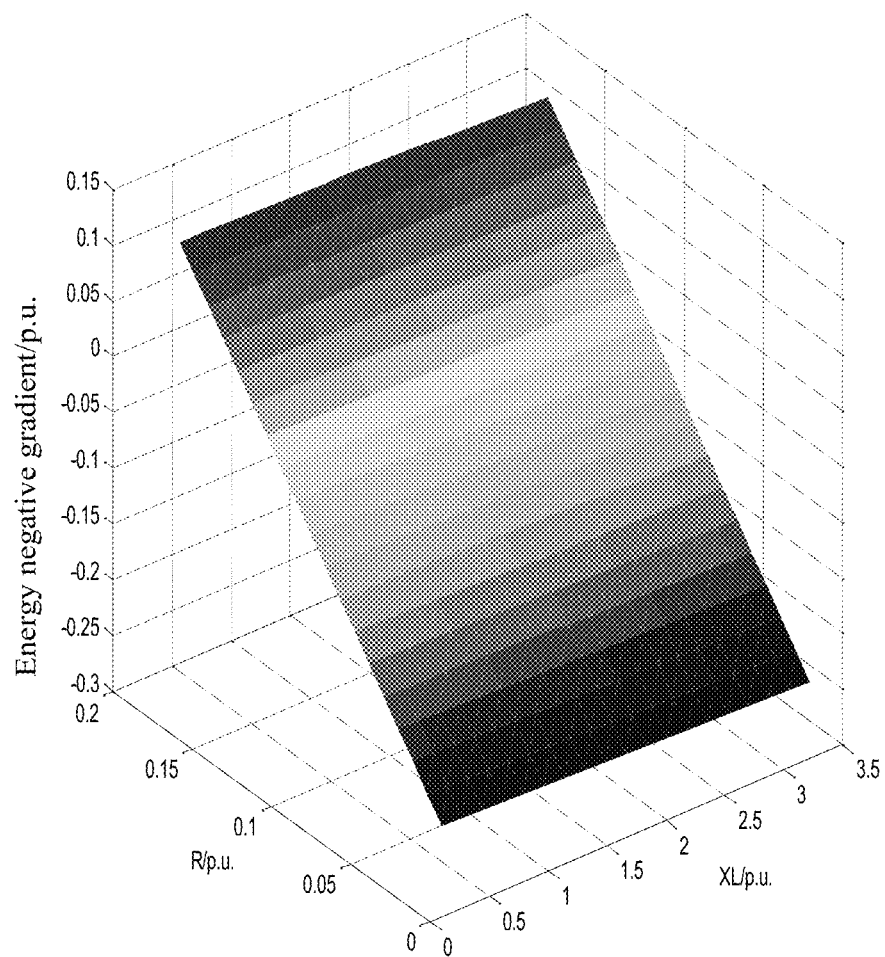
FIG. 11 is diagram of the energy negative gradient of direct-drive wind turbine generator for different grid lines parameters in another embodiment.

FIG. 11 shows the effect of different transmission lines parameters on the energy negative gradient. where line resistance R increases from 0.01 p.u. to 0.2 p.u. in the step of 0.005 p.u., and grid equivalent reactance XL increases from 0.5 p.u. to 3.5 p.u. in the step of 0.05 p.u. It can be seen that, as line resistance increases, the energy negative gradient of system increasingly sharply. The effect of grid equivalent reactance on the energy negative gradient is relatively smaller than the effect of line resistance on it. As grid equivalent reactance increases, i.e. as the strength of grid decreases, the energy negative gradient of system also decreases, and system stability level drops.

Figure 12:
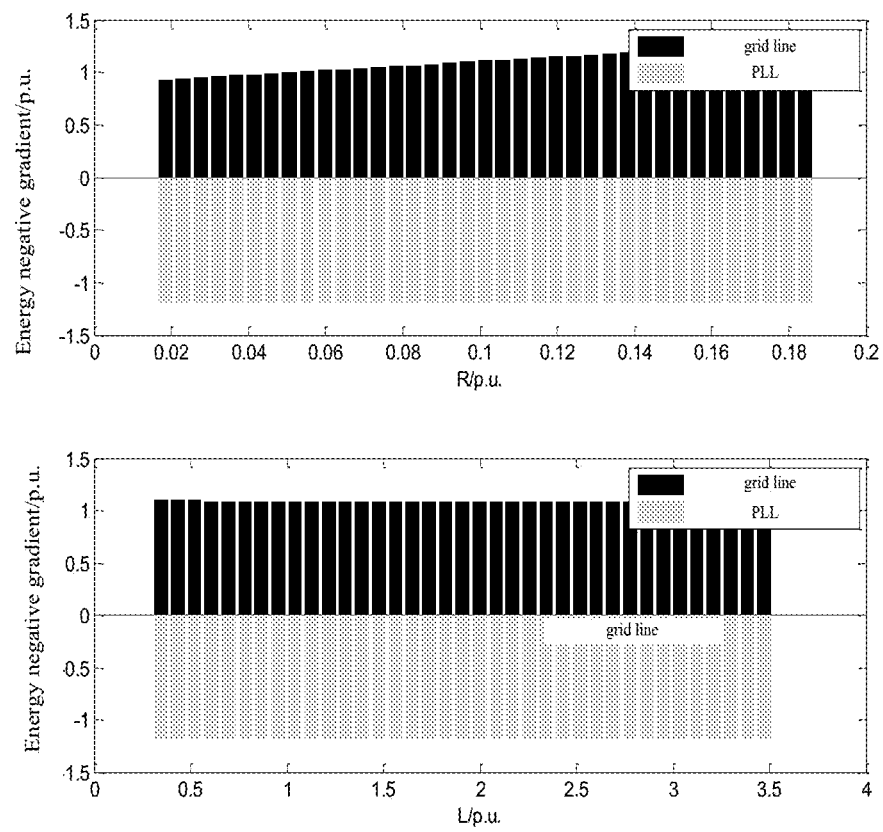
FIG. 12 is the change diagram of energy negative gradient components of direct-drive wind turbine generator for different grid lines parameters in another embodiment.

The variation curves of components of energy negative gradient corresponding to different values of grid parameters are shown in FIG. 12. FIG. 12(a) shows the variation trends of energy negative gradient of lines and that of PLL when grid equivalent reactance remains 1.06 p.u. and line resistance increases. The energy negative gradient of PLL is relevant to line impedance angle. Since line resistance varies between 0.01 p.u. and 0.2 p.u., line impedance angle only varies very small in a small range between 79.3° and 88.46°. Thus, the energy negative gradient of PLL is scarcely affected by line resistance, while the energy negative gradient of line is almost linearly correlated with line resistance and increases significantly as line resistance increases. FIG. 12(b) shows the variation curves of components of energy negative gradient when line resistance remains 0.04p.u. and the strength of grid decreases. It can be seen that, the effect of grid strength on the energy negative gradient of line is much smaller than the effect of line resistance on it. However, according to the enlarged display, the energy negative gradient of line decreases as the strength of grid decreases.

A non-transitory machine-readable storage medium comprising instructions that when executed cause a processor of a computing device to: collect variation of voltage, current, active power and PLL angle at the terminal of direct-drive wind turbine generator; calculate the terminal energy of direct-drive wind turbine generator based on the variation; assess the stability level of direct-drive wind turbine generator according to the value of energy negative gradient; analyze the influence patterns of stable operation points, PLL and transmission lines parameters on the energy negative gradient and propose the adjustment law of critical parameters to improve the stability of the system; and output the stability level of the system and adjustment law of the critical parameters affecting system stability.

Through the simulation experiment, the stability evaluation and parameter analysis under different oscillation scenarios are realized, which improves the security and reliability of the system.

It can be understood by those skilled in the art that all or part of the flow of the method of the above embodiment can be realized by instructing related hardware through a computer program, which can be stored in a computer-readable storage medium. Wherein, the computer-readable storage medium is a disk, an optical disc, a read-only storage memory, a random storage memory, and the like.

The above is only a preferred embodiment of the application, but the scope of protection of the application is not limited to this. Any change or replacement that can be easily thought of by any person familiar with the technical field within the technical scope of the application shall be covered in the scope of protection of the application The foregoing descriptions of specific exemplary embodiments of the present application have been presented for purposes of illustration and description. They are not intended to be exhaustive or to limit the application to the precise forms disclosed, and obviously many modifications and variations are possible in light of the above teachings. The exemplary embodiments were chosen and described in order to explain certain principles of the application and their practical application, to thereby enable others skilled in the art to make and utilize various exemplary embodiments of the present application, as well as various alternatives and modifications thereof. It is intended that the scope of the application be defined by the Claims appended hereto and their equivalents.

What is claimed is:

1. A stability evaluation method of direct-drive wind turbine generator, comprising:
measuring, with a Phasor Measurement Unit (PMU), variations of voltage, current, active power and PLL (Phase Locked Loop) angle at a terminal of direct-drive wind turbine generator in one oscillation period $$\frac{2\pi}{\omega};$$

based on the measured variations, calculating terminal energy of direct-drive wind turbine generator with a terminal energy model of direct-drive wind turbine generator, wherein the terminal energy model of direct-drive wind turbine generator comprises:

$$\Delta W_{PMSG}(t) = \int_t^{t+\frac{2\pi}{\omega}} \Delta P_e d\Delta\theta_{pll} + \int_t^{t+\frac{2\pi}{\omega}} (\Delta i_d d\Delta u_q - \Delta i_q d\Delta u_d)$$

where $\Delta P_e$ is the variation of direct-drive wind turbine generator output active power compared with the steady-state value, $\Delta\theta_{pll}$ is the variation of PLL angle, $\Delta i_d$, $\Delta i_q$, $\Delta u_q$ and $\Delta u_d$ are respectively the variation of d-axis and q-axis components of current and voltage at the terminal of direct-drive wind turbine generator, $\omega$ is the oscillation frequency of dq axis;
obtaining energy negative gradient of direct-drive wind turbine generator according to discretized and average values of the terminal energy of direct-drive wind turbine generator, and assessing system stability level according to a value of the energy negative gradient, wherein the larger the value of the energy negative gradient is, the higher the system stability level is; and
obtaining an adjustment law of critical parameters affecting the stability of the system based on the energy negative gradient with stability operation points and critical parameters PLL and transmission lines, which comprises the following steps S1-S2:
step S1: applying the PLL dynamic function to the energy negative gradient expression, achieving the energy negative gradient with stability operation points and PLL critical parameters:

$$\eta_2 = -\left(I_{sd0}\omega\frac{\cos\varphi_c}{2} + I_{sq0}\omega\frac{\sin\varphi_c}{2}\right)$$

$$\left[A_-(t)\Omega_{u-}\alpha_u e^{\alpha_u t} + \frac{dA_-(t)}{dt}\Omega_{u-}e^{\alpha_u t}\right]\Big|_{t_0}^{t_0+\frac{2\pi}{\omega}} -$$

$$U_{sd0}(\omega)\frac{\cos(\varphi_c - \varphi_{RL})}{2}\left[A_-(t)\alpha_i\Omega_{i-}e^{\alpha_i t} + \frac{dA_-(t)}{dt}\Omega_{i-}e^{\alpha_i t}\right]\Big|_{t_0}^{t_0+\frac{2\pi}{\omega}} +$$

$$(I_{sd0}(\omega))\frac{\cos\varphi_c}{2} + I_{sq0}\omega\frac{\sin\varphi_c}{2}\right)[A_+(t)\Omega_{u+}\alpha_u e^{\alpha_u t} +$$

$$\frac{dA_+(t)}{dt}\Omega_{u+}e^{\alpha_u t}\right]\Big|_{t_0}^{t_0+\frac{2\pi}{\omega}} + U_{sd0}\omega\frac{\cos(\varphi_c - \varphi_{RL})}{2}\left[A_+(t)\alpha_i\Omega_{i+}e^{\alpha_i t} + \frac{dA_+(t)}{dt}\Omega_{i+}e^{\alpha_i t}\right]\Big|_{t_0}^{t_0+\frac{2\pi}{\omega}} -$$

$$2\omega K_{pll}^2\Omega_{u-}\Omega_{u+}e^{2\alpha_u t}\alpha_u\sin\varphi_c[I_{sd0}\sin(\varphi_{u+} + \varphi_u) - I_{sq0}\cos(\varphi_{u+} + \varphi_{u-})]\Big|_{t_0}^{t_0+\frac{2\pi}{\omega}}$$

Where $A_-$, $A_+$ respectively represent the amplitude of PLL angle variation $\Delta\theta_{pll}$ in sub-synchronous frequency and super-synchronous frequency; $I_{sd0}$, $I_{sq0}$, $U_{sd0}$, $U_{sq0}$ are the original value of dq axes components of current and voltage of the terminal of direct-drive wind turbine generator; $\alpha_u$ and $\alpha_i$ are the attenuation coefficients of oscillation components of voltage and current; $\Omega_{u-}$, $\Omega_{u+}$, $\Omega_{i-}$ and $\Omega_{i+}$ are respectively the amplitude coefficients of sub/super synchronous components of voltage and current; $\varphi_{u-}$ and $\varphi_{u+}$ are the initial phase angles of sub-synchronous and super-synchronous voltage; $\varphi_{i-}$ and $\varphi_{i+}$ are the initial phase angles of sub-synchronous and super-synchronous currents; $\Omega_{u+} = \Omega_{i+} X_+$, $\Omega_{u-} = \Omega_{i-} X_-$, $\varphi_{u-} = \varphi_{i-} + \varphi_{RL}$ and $\varphi_{u+} = \varphi_{i+} + \varphi_{RL}$, where $\varphi_{RL}$ is the phase angle of transmission lines; $k_{p\theta}$ and $k_{i\theta}$ are the proportion gain and integration gain of PLL;

$$\varphi_c = \arctan \frac{\omega k_{p\theta}}{k_{i\theta}}, K_{pll} = \left| \frac{k_{p\theta}s + k_{i\theta}}{s^2 - U_{sq0}(k_{p\theta}s + k_{i\theta})} \right|_{s=j\omega};$$

applying the dynamic function of system transmission lines to the energy negative gradient expression, obtaining the energy negative gradient of critical parameters of transmission lines:

$$\eta_1 = -2\Omega_{i+}\Omega_{i-}e^{2\alpha_i t}\alpha_i X_L \omega \sin(\varphi_{i+} + \varphi_{i-})\big|_{t_0}^{t_0 + \frac{2\pi}{\omega}} + $$
$$2[\Omega_{i-}^2 e^{2\alpha_i t}\alpha_i \omega R - \Omega_{i+}\Omega_{i-}e^{2\alpha_i t}\alpha_i R \omega \cos(\varphi_{i+} + \varphi_{i-})]\big|_{t_0}^{t_0 + \frac{2\pi}{\omega}}$$

where $\Omega_{i-}$ and $\Omega_{i+}$ are the amplitude coefficients of current sub-synchronous component and super-synchronous component respectively; $\alpha_i$ is the attenuation coefficients of oscillation components of current; R and $X_L$ are line resistance and the equivalent reactance of the transmission lines; $\varphi_{1-}$ and $\varphi_{i+}$ are the initial phase angles of sub-synchronous and super-synchronous currents; and step S2: based on the constructed energy negative gradient with the critical parameters of stability operation points of direct-drive wind turbine generator, PLL and the transmission lines, obtaining influence pattern of these parameters on the energy negative gradient;

wherein the adjustment law comprises: the stability level of system is improved by reducing $I_{sd0}$ or increasing $I_{sq0}$; the more stable the system is the larger R is and the smaller $X_L$ is; the system stability is enhanced by reducing PLL parameters $K_p$ and $K_i$.

2. The stability evaluation method of direct-drive wind turbine generator according to claim 1, the calculation process of energy negative gradient comprises:

step 1: discretizing the terminal energy:

$$\Delta W_{PMSG}(i) = \sum_{t=t_i}^{t+\frac{2\pi}{\omega}} \Delta W_{PMSG}(t)$$

the value of terminal energy of direct-drive wind turbine generator at the time $t_1, \ldots t_n$, i.e. $\Delta W_{PMSG}(t_1), \ldots, \Delta W_{PMSG}(t_n)$ can be obtained; n is the number of data; and step 2: with discretized terminal energy $\Delta W_{PMSG}(t_1), \ldots, \Delta W_{PMSG}(t_n)$, calculating the energy negative gradient $\eta$.

3. The stability evaluation method of direct-drive wind turbine generator according to claim 2, the step 2 comprises:
calculating the discretized average value of the discretized terminal energy of direct-drive wind turbine generator by the following formula;

$$\Delta \overline{W}_{PMSG} = \frac{1}{n}\sum_{i=1}^{n} \Delta W_{PMSG}(i)$$

with the discretized terminal energy $\Delta W_{PMSG}(t_1), \ldots, \Delta W_{PMSG}(t_n)$ and its average value, obtaining the energy negative gradient by the following formula:

$$\eta = -\nabla \left[ \frac{|\Delta W_{PMSG}(t) - \Delta \overline{W}_{PMSG}|}{\left(\frac{1}{n}\sum_{t=1}^{n}(\Delta W_{PMSG}(t) - \Delta \overline{W}_{PMSG})^2\right)^{\frac{1}{2}}} \right]$$

where $\nabla[\cdot]$ is the symbol of gradient.

4. The stability evaluation method of direct-drive wind turbine generator according to claim 3, assessing the system stability level according to $\eta$: when $\eta$ is positive, the system is stable and the larger the value of $\eta$ is, the higher the system stability level is; when $\eta$ is zero, the system is critically stable; when $\eta$ is negative, the system will go unstable, and as the absolute value of $\eta$ increases, system stability level will drop.

5. A stability evaluation system of direct-drive wind turbine generator, comprising: a Phasor Measurement Unit (PMU), a first processor, a second processor, a third processor and result output terminal, wherein the PMU is used to collect variations of voltage, current, active power and PLL (Phase Locked Loop) angle at a terminal of direct-drive wind turbine generator in one oscillation period $$\frac{2\pi}{\omega};$$

the first processor is used to calculate terminal energy of direct-drive wind turbine generator with a terminal energy model of direct-drive wind turbine generator based on the measured variations, wherein the terminal energy model of direct-drive wind turbine generator is:

$$\Delta W_{PMSG}(t) = \int_{t}^{t+\frac{2\pi}{\omega}} \Delta P_e d\Delta\theta_{pll} + \int_{t}^{t+\frac{2\pi}{\omega}} (\Delta i_d d\Delta u_q - \Delta i_q d\Delta u_d)$$

where $\Delta P_e$ is the variation of direct-drive wind turbine generator output active power compared with a steady-state value, $\Delta\theta_{pll}$ is the variation of PLL angle, $\Delta i_d$, $\Delta i_q$, $\Delta u_q$ and $\Delta u_d$ are respectively the variation of d-axis and q-axis components of current and voltage at the terminal of direct-drive wind turbine generator, $\omega$ is the oscillation frequency of dq axis;

the second processor is used to assess stability level of direct-drive wind turbine generator according to a value of energy negative gradient which is obtained according to discretized and average values of the terminal energy of direct-drive wind turbine generator, wherein the larger the value of the energy negative gradient is, the higher the system stability level is;

the third processor is used to obtain an adjustment law of critical parameters affecting the stability of the system based on the energy negative gradient with stability operation points and critical parameters PLL and transmission lines; and the result output terminal is used to output the stability level of the system and the adjustment law of the critical parameters affecting system stability;

wherein the third processor is operable for step S1: applying the PLL dynamic function to the energy negative gradient expression, achieving the energy negative gradient with stability operation points and PLL critical parameters:

$$\eta_2 =$$

$$-\left(I_{sd0}\omega\frac{\cos\varphi_c}{2}+I_{sq0}\omega\frac{\sin\varphi_c}{2}\right)\left[A_-(t)\Omega_{u-}\alpha_u e^{\alpha_u t}+\frac{dA_-(t)}{dt}\Omega_{u-}e^{\alpha_u t}\right]\Big|_{t_0}^{t_0+\frac{2\pi}{\omega}} -$$

$$U_{sd0}\omega\frac{\cos(\varphi_c-\varphi_{RL})}{2}\left[A_-(t)\alpha_i\Omega_{i-}e^{\alpha_i t}+\frac{dA_-(t)}{dt}\Omega_{i-}e^{\alpha_i t}\right]\Big|_{t_0}^{t_0+\frac{2\pi}{\omega}} +$$

$$\left(I_{sd0}\omega\frac{\cos\varphi_c}{2}+I_{sq0}\omega\frac{\sin\varphi_c}{2}\right)\left[A_+(t)\Omega_{u+}\alpha_u e^{\alpha_u t}+\frac{dA_+(t)}{dt}\Omega_{u+}e^{\alpha_u t}\right]\Big|_{t_0}^{t_0+\frac{2\pi}{\omega}} +$$

$$U_{sd0}\omega\frac{\cos(\varphi_c-\varphi\phi_{RL})}{2}\left[A_+(t)\alpha_i\Omega_{i+}e^{\alpha_i t}+\frac{dA_+(t)}{dt}\Omega_{i+}e^{\alpha_i t}\right]\Big|_{t_0}^{t_0+\frac{2\pi}{\omega}} -$$

$$2\omega K_{pll}^2\Omega_{u-}\Omega_{u+}e^{2\alpha_u t}\alpha_u\sin\varphi_c[I_{sd0}\sin(\varphi_{u+}+\varphi_{u-})-I_{sq0}\cos(\varphi_{u+}+\varphi_{u-})]\Big|_{t_0}^{t_0+\frac{2\pi}{\omega}}$$

Where $A_-$, $A_+$ respectively represent the amplitude of PLL angle variation $\Delta\theta_{pll}$ in sub-synchronous frequency and super-synchronous frequency; $I_{sd0}$, $I_{sq0}$, $U_{sd0}$, $U_{sq0}$ are the original value of dq axes components of current and voltage of the terminal of direct-drive wind turbine generator; $\alpha_u$ and $\alpha_i$ are the attenuation coefficients of oscillation components of voltage and current; $\Omega_{u-}$, $\Omega_{u+}$, $\Omega_{i-}$ and $\Omega_{i+}$ are respectively the amplitude coefficients of sub/super synchronous components of voltage and current; $\varphi_{u-}$ and $\varphi_{u+}$ are the initial phase angles of sub-synchronous and super-synchronous voltage; $\varphi_{i-}$ and $\varphi_{i+}$ are the initial phase angles of sub-synchronous and super-synchronous currents; $\Omega_{u+}=\Omega_{i+}X_+$, $\Omega_{u-}=\Omega_{i-}X_-$, $\varphi_{u-}=\varphi_{i-}+\varphi_{RL}$ and $\varphi_{u+}=\varphi_{i+}+\varphi_{RL}$, where $\varphi_{RL}$ is the phase angle of transmission lines; $k_{p\theta}$ and $k_{i\theta}$ are the proportion gain and integration gain of PLL;

$$\varphi_c = \arctan\frac{\omega k_{p\theta}}{k_{i\theta}}, \quad K_{pll} = \left|\frac{k_{p\theta}s+k_{i\theta}}{s^2-U_{sq0}(k_{p\theta}s+k_{i\theta})}\right|_{s-j\omega};$$

applying the dynamic function of system transmission lines to the energy negative gradient expression, obtaining the energy negative gradient of critical parameters of transmission lines:

$$\eta_1 = -2\Omega_{i+}\Omega_{i-}e^{2\alpha_i t}\alpha_i X_L\omega\sin(\varphi_{i+}+\varphi_{i-})\Big|_{t_0}^{t_0+\frac{2\pi}{\omega}} +$$

$$2[\Omega_{i-}^2 e^{2\alpha_i t}\alpha_i\omega R - \Omega_{i+}\Omega_{i-}e^{2\alpha_i t}\alpha_i R\omega\cos(\varphi_{i+}+\varphi_{i-})]\Big|_{t_0}^{t_0+\frac{2\pi}{\omega}}$$

where $\Omega_{i-}$ and $\Omega_{i+}$ are the amplitude coefficients of current sub-synchronous component and super-synchronous component respectively; $\alpha_i$ is the attenuation coefficients of oscillation components of current; R and $X_L$ are line resistance and the equivalent reactance of the transmission lines; $\varphi_{1-}$ and $\varphi_{i+}$ are the initial phase angles of sub-synchronous and super-synchronous currents; and step S2: based on the constructed energy negative gradient with the critical parameters of stability operation points of direct-drive wind turbine generator, PLL and the transmission lines, obtaining influence pattern of these parameters on the energy negative gradient, wherein the adjustment law comprises: the stability level of system is improved by reducing $I_{sd0}$ or increasing $I_{sq0}$; the more stable the system is the larger R is and the smaller $X_L$ is; the system stability is enhanced by reducing PLL parameters $K_p$ and $K_i$.

6. The stability evaluation system of direct-drive wind turbine generator according to claim 5, the PMU equipped at the terminal of direct-drive wind turbine generator.

7. The stability evaluation system of direct-drive wind turbine generator according to claim 5, where the second processor is used to assess the stability level of the system according to the value of energy negative gradient, comprising:

S1: discretizing the terminal energy:

$$\Delta W_{PMSG}(i) = \sum_{t=t_i}^{t_i+\frac{2\pi}{\omega}}\Delta W_{PMSG}(t)$$

the value of terminal energy of direct-drive wind turbine generator at the time, $t_1, \ldots t_n$, i.e. $\Delta W_{PMSG}(t_1), \ldots, \Delta W_{PMSG}(t_n)$ can be calculated; n is the number of data;

S2: with discretized terminal energy $\Delta W_{PMSG}(t_1), \ldots, \Delta W_{PMSG}(t_n)$, calculating the energy negative gradient $\eta$, which comprises the following steps in detail:

calculating the discretized average terminal energy of direct-drive wind turbine generator by the following formula:

$$\Delta\overline{W}_{PMSG} = \frac{1}{n}\sum_{i=1}^{n}\Delta W_{PMSG}(i)$$

with the discretized terminal energy $\Delta W_{PMSG}(t_1), \ldots, \Delta W_{PMSG}(t_n)$ and its average value; obtaining the energy negative gradient can be based on the following formula;

$$\eta = -\nabla \left[ \frac{|\Delta W_{PMSG}(t) - \Delta \overline{W}_{PMSG}|}{\left(\frac{1}{n}\sum_{t=1}^{n}(\Delta W_{PMSG}(t) - \Delta \overline{W}_{PMSG})^2\right)^{\frac{1}{2}}} \right]$$

where $\nabla[\bullet]$ is the symbol of gradient; and

S3: assessing the stability level of system according to $\eta$: when $\eta$ is positive, the system is stable and the larger the absolute value of $\eta$ is, the higher the system stability level is; when $\eta$ is zero, the system is critically stable; when $\eta$ is negative, the system will go unstable, and as the absolute value of $\eta$ increases, system stability level will drop.

8. A non-transitory machine-readable storage medium comprising instructions that when executed cause a processor of a computing device to:

measuring, by a Phasor Measurement Unit (PMU), variations of voltage, current, active power and PLL (Phase Locked Loop) angle at a terminal of direct-drive wind turbine generator in one oscillation period $$\frac{2\pi}{\omega};$$

based on the measured variations, calculating terminal energy of direct-drive wind turbine generator with a terminal energy model of direct-drive wind turbine generator, wherein the terminal energy model of direct-drive wind turbine generator is:

$$\Delta W_{PMSG}(t) = \int_{t}^{t+\frac{2\pi}{\omega}} \Delta P_e d\Delta\theta_{pll} + \int_{t}^{t+\frac{2\pi}{\omega}} (\Delta i_d d\Delta u_q - \Delta i_q d\Delta u_d)$$

where $\Delta P_e$ is the variation of direct-drive wind turbine generator output active power compared with the steady-state value, $\Delta\theta_{pll}$ is the variation of PLL angle, $\Delta i_d$, $\Delta i_q$, $\Delta u_q$ and $\Delta u_d$ are respectively the variation of d-axis and q-axis components of current and voltage at the terminal of direct-drive wind turbine generator, $\omega$ is the oscillation frequency of dq axis;

obtaining energy negative gradient of direct-drive wind turbine generator according to discretized and average values of the terminal energy of direct-drive wind turbine generator, and assessing system stability level according to a value of the energy negative gradient, wherein the larger the value of the energy negative gradient is, the higher the system stability level is; and obtaining an adjustment law of critical parameters affecting the stability of the system based on the energy negative gradient with stability operation points and critical parameters PLL and transmission lines, which comprises the following steps S1-S2:

step S1: applying the PLL dynamic function to the energy negative gradient expression, achieving the energy negative gradient with stability operation points and PLL critical parameters:

$$\eta_2 = -\left(I_{sd0}\omega\frac{\cos\varphi_c}{2} + I_{sq0}\omega\right)\frac{\sin\varphi_c}{2}$$

$$\left[A_-(t)\Omega_{u-}\alpha_u e^{\alpha_u t} + \frac{dA_-(t)}{dt}\Omega_{u-}e^{\alpha_u t}\right]\Big|_{t_0}^{t_0+\frac{2\pi}{\omega}} -$$

$$U_{sd0}(\omega)\frac{\cos(\varphi_c - \varphi_{RL})}{2}\left[A_-(t)\alpha_i\Omega_{i-}e^{\alpha_i t} + \frac{dA_-(t)}{dt}\Omega_{i-}e^{\alpha_i t}\right]\Big|_{t_0}^{t_0+\frac{2\pi}{\omega}} +$$

$$(I_{sd0}\omega)\frac{\cos\varphi_c}{2} + I_{sq0}\omega\frac{\sin\varphi_c}{2}[A_+(t)\Omega_{u+}\alpha_u e^{\alpha_u t} +$$

$$\frac{dA_+(t)}{dt}\Omega_{u+}e^{\alpha_u t}\Big]\Big|_{t_0}^{t_0+\frac{2\pi}{\omega}} + U_{sd0}\omega\frac{\cos(\varphi_c-\varphi_{RL})}{2}\left[A_+(t)\alpha_i\Omega_{i+}e^{\alpha_i t} + \frac{dA_+(t)}{dt}\Omega_{i+}e^{\alpha_i t}\right]\Big|_{t_0}^{t_0+\frac{2\pi}{\omega}} -$$

$$2\omega K_{pll}^2 \Omega_{u-}\Omega_{u+}e^{2\alpha_u t}\alpha_u \sin\varphi_c[I_{sd0}\sin(\varphi_{u+} + \varphi_u) - I_{sq0}\cos(\varphi_{u+} + \varphi_{u-})]\Big|_{t_0}^{t_0+\frac{2\pi}{\omega}}$$

Where $A_-$, $A_+$ respectively represent the amplitude of PLL angle variation $\Delta\theta_{pll}$ in sub-synchronous frequency and super-synchronous frequency; $I_{sd0}$, $I_{sq0}$, $U_{sd0}$, $U_{sq0}$ are the original value of dq axes components of current and voltage of the terminal of direct-drive wind turbine generator; $\alpha_u$ and $\alpha_i$ are the attenuation coefficients of oscillation components of voltage and current; $\Omega_{u-}$, $\Omega_{u+}$, $\Omega_{i-}$ and $\Omega_{i+}$ are respectively the amplitude coefficients of sub/super synchronous components of voltage and current; $\varphi_{u-}$ and $\varphi_{u+}$ are the initial phase angles of sub-synchronous and super-synchronous voltage; $\varphi_{i-}$ and $\varphi_{i+}$ are the initial phase angles of sub-synchronous and super-synchronous currents; $\Omega_{u+}=\Omega_{i+}X_+$, $\Omega_{u-}=\Omega_{i-}X_-$, $\varphi_{u-}=\varphi_{i-}+\varphi_{RL}$ and $\varphi_{u+}=\varphi_{i+}+\varphi_{RL}$, where $\varphi_{RL}$ is the phase angle of transmission lines; $k_{p\theta}$ and $k_{i\theta}$ are the proportion gain and integration gain of PLL;

$$\varphi_c = \arctan\frac{\omega k_{p\theta}}{k_{i\theta}}, K_{pll} = \left|\frac{k_{p\theta}s + k_{i\theta}}{s^2 - U_{sq0}(k_{p\theta}s + k_{i\theta})}\right|_{s=j\omega};$$

applying the dynamic function of system transmission lines to the energy negative gradient expression, obtaining the energy negative gradient of critical parameters of transmission lines:

$$\eta_1 = -2\Omega_{i+}\Omega_{i-}e^{2\alpha_i t}\alpha_i X_L \omega\sin(\varphi_{i+} + \varphi_{i-})\Big|_{t_0}^{t_0+\frac{2\pi}{\omega}} +$$

$$2\left[\Omega_{i-}^2 e^{2\alpha_i t}\alpha_i \omega R - \Omega_{i+}\Omega_{i-}e^{2\alpha_i t}\alpha_i R\omega\cos(\varphi_{i+} + \varphi_{i-})\right]\Big|_{t_0}^{t_0+\frac{2\pi}{\omega}}$$

where $\Omega_{i-}$ and $\Omega_{i+}$ are the amplitude coefficients of current sub-synchronous component and super-synchronous component respectively; $\alpha_i$ is the attenuation coefficients of oscillation components of current; R and $X_L$ are line resistance and the equivalent reactance of the transmission lines; $\varphi_{1-}$ and $\varphi_{i+}$ are the initial phase angles of sub-synchronous and super-synchronous currents; and step S2: based on the constructed energy negative gradient with the critical parameters of stability operation points of direct-drive wind turbine generator, PLL and the transmission lines, obtaining influence pattern of these parameters on the energy negative gradient;

wherein the adjustment law comprises: the stability level of system is improved by reducing $I_{sd0}$ or increasing $I_{sq0}$; the more stable the system is the larger R is and the smaller $X_L$ is; the system stability is enhanced by reducing PLL parameters $K_p$ and $K_i$.

\* \* \* \* \*